(12) United States Patent
Bates

(10) Patent No.: US 11,790,920 B2
(45) Date of Patent: *Oct. 17, 2023

(54) GUEST ACCESS FOR VOICE CONTROL OF PLAYBACK DEVICES

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,693

(22) Filed: Jul. 18, 2022

(65) Prior Publication Data

US 2022/0351733 A1 Nov. 3, 2022

Related U.S. Application Data

(63) Continuation of application No. 16/709,357, filed on Dec. 10, 2019, now Pat. No. 11,393,478.

(Continued)

(51) Int. Cl.
*G10L 17/00* (2013.01)
*G06F 3/16* (2006.01)
(Continued)

(52) U.S. Cl.
CPC ............. *G10L 17/00* (2013.01); *G06F 3/165* (2013.01); *H04L 67/125* (2013.01); *H04L 67/306* (2013.01)

(58) Field of Classification Search
CPC ....... G01S 15/04; G01S 3/8083; G05B 15/02; G05B 15/28; G06F 1/3215; G06F 3/165; G06F 3/167; G06F 16/68; G06F 21/554; G06F 1/3231; G06F 3/16; G06F 3/012; G06F 3/0304; G08B 25/008;
(Continued)

(56) References Cited

U.S. PATENT DOCUMENTS 5,440,644 A 8/1995 Farinelli et al.
5,465,240 A 11/1995 Mankovitz
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Gerald Gauthier
(74) *Attorney, Agent, or Firm* — Akerman LLP

(57) ABSTRACT

Playback devices comprising a network interface, an optional speaker(s), and one or more processors are disclosed herein. In some embodiments, the playback device is configured to communicate with a computing system that stores configuration data corresponding to each of a plurality of users. The playback device detects one or more users near the playback device and retrieves user configuration data corresponding to each of the one or more detected users, and thereafter, uses the user configuration data of the one or more detected users to process voice commands, play media content, and/or perform other voice and/or media related functions.

30 Claims, 11 Drawing Sheets

Related U.S. Application Data

(60) Provisional application No. 62/778,512, filed on Dec. 12, 2018.

(51) Int. Cl.
*H04L 67/306* (2022.01)
*H04L 67/125* (2022.01)

(58) Field of Classification Search
CPC .......... G08B 15/002; G09G 5/00; G09G 5/02; G10L 15/16; G10L 17/00; G10L 17/08; G10L 21/0364; G10L 13/00; G10L 15/02; G10L 15/22; G10L 25/84; G10L 15/20; G10L 15/28; G10L 21/0272; G10L 21/0316; G11B 27/038; G11B 27/322; H03G 5/02; H03J 9/02; H04L 51/224; H04L 65/4015; H04L 65/611; H04L 67/125; H04L 67/306; H04L 67/55; H04L 51/02; H04L 41/0893; H04L 65/1066; H04M 1/2475; H04M 1/72442; H04M 3/563; H04M 1/72415; H04N 21/262; H04N 21/42203; H04N 21/4305; H04N 21/4304; H04N 21/47202; H04N 21/4104; H04N 21/4394; H04N 9/3179; H04R 1/025; H04R 1/0893; H04W 8/005; H04S 7/00
See application file for complete search history.

(56) References Cited

U.S. PATENT DOCUMENTS

| | | | |
|---|---|---|---|
| 5,598,388 A | 1/1997 | Van et al. | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,347,065 B1 | 2/2002 | Fleming, III | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,615,573 B1 | 12/2013 | Walsh et al. | |
| 8,942,252 B2 | 1/2015 | Balassanian et al. | |
| 9,251,787 B1 * | 2/2016 | Hart ................ H03G 5/02 | |
| 9,318,152 B2 * | 4/2016 | Kretz ................ H04W 8/005 | |
| 9,494,683 B1 * | 11/2016 | Sadek ................ G01S 15/04 | |
| 9,747,070 B1 * | 8/2017 | Mutagi ................ G06F 3/165 | |
| 9,965,247 B2 | 5/2018 | Jarvis et al. | |
| 10,380,852 B2 * | 8/2019 | Horling ................ G08B 25/008 | |
| 10,389,782 B2 * | 8/2019 | Alsina ................ H04L 65/4015 | |
| 10,424,296 B2 * | 9/2019 | Penilla ................ G10L 25/84 | |
| 10,438,591 B1 * | 10/2019 | Sharifi ................ G10L 15/22 | |
| 10,536,288 B1 * | 1/2020 | Leblang ................ H04M 3/563 | |
| 10,762,900 B2 * | 9/2020 | Ben-dor ................ G10L 13/00 | |
| 10,971,139 B2 | 4/2021 | Millington et al. | |
| 10,984,790 B2 * | 4/2021 | Lim ................ G10L 15/28 | |
| 11,355,135 B1 * | 6/2022 | Ho ................ G10L 21/0364 | |
| 11,393,478 B2 * | 7/2022 | Bates ................ G10L 17/00 | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2004/0073426 A1 | 4/2004 | Jung | |
| 2007/0011007 A1 * | 1/2007 | Greene ................ H03J 9/02 704/246 | |
| 2007/0142944 A1 | 6/2007 | Goldberg et al. | |
| 2008/0086687 A1 * | 4/2008 | Sakai ................ G11B 27/038 715/810 | |
| 2008/0146289 A1 | 6/2008 | Korneluk et al. | |
| 2009/0013260 A1 | 1/2009 | Martin et al. | |
| 2009/0157747 A1 | 6/2009 | McLean et al. | |
| 2010/0017455 A1 | 1/2010 | Svendsen et al. | |
| 2011/0125989 A1 | 5/2011 | Amidon et al. | |
| 2011/0208524 A1 * | 8/2011 | Haughay ................ G10L 17/08 704/E15.001 | |
| 2012/0191461 A1 * | 7/2012 | Lin ................ G06F 3/165 704/E21.001 | |
| 2012/0270576 A1 * | 10/2012 | Herrington ................ H04L 65/611 455/466 | |
| 2013/0174204 A1 | 7/2013 | Coburn, IV et al. | |
| 2013/0228063 A1 | 9/2013 | Turner | |
| 2013/0317635 A1 | 11/2013 | Bates et al. | |
| 2014/0003789 A1 | 1/2014 | Konduru | |
| 2014/0006483 A1 | 1/2014 | Garmark et al. | |
| 2014/0108011 A1 * | 4/2014 | Nishino ................ G01S 3/8083 704/246 | |
| 2014/0154993 A1 | 6/2014 | Bates et al. | |
| 2014/0229959 A1 | 8/2014 | Beckhardt et al. | |
| 2014/0236726 A1 | 8/2014 | Acosta et al. | |
| 2014/0379343 A1 * | 12/2014 | Karimi-Cherkandi ................ H04M 1/2475 704/246 | |
| 2015/0086034 A1 | 3/2015 | Lombardi et al. | |
| 2015/0095323 A1 | 4/2015 | Bates | |
| 2015/0170665 A1 * | 6/2015 | Gundeti ................ G06F 3/167 704/270.1 | |
| 2015/0280670 A1 * | 10/2015 | Kauffmann ................ G10L 21/0316 381/107 | |
| 2015/0319288 A1 * | 11/2015 | Kahn ................ H04M 1/72442 455/41.2 | |
| 2016/0291925 A1 | 10/2016 | Kohara et al. | |
| 2016/0299669 A1 | 10/2016 | Bates | |
| 2016/0299736 A1 | 10/2016 | Bates et al. | |
| 2017/0004828 A1 * | 1/2017 | Lee ................ G06F 3/012 | |
| 2017/0242653 A1 | 8/2017 | Lang et al. | |
| 2018/0089315 A1 * | 3/2018 | Seiber ................ G06F 16/68 | |
| 2018/0190264 A1 * | 7/2018 | Mixter ................ H04L 67/55 | |
| 2018/0197533 A1 * | 7/2018 | Lyon ................ G10L 15/16 | |
| 2018/0293045 A1 * | 10/2018 | Lambourne ................ G05B 15/02 | |
| 2018/0330589 A1 | 11/2018 | Horling | |
| 2018/0342243 A1 * | 11/2018 | VanBlon ................ G06F 3/167 | |
| 2018/0352014 A1 * | 12/2018 | Alsina ................ H04N 21/262 | |
| 2018/0359557 A1 | 12/2018 | Norell et al. | |
| 2018/0374485 A1 * | 12/2018 | Cao ................ H04M 1/72415 | |
| 2019/0035356 A1 * | 1/2019 | Wu ................ G09G 5/00 | |
| 2019/0081949 A1 * | 3/2019 | Wu ................ G06F 21/554 | |
| 2019/0237078 A1 * | 8/2019 | Park ................ H04N 9/3179 | |
| 2019/0279635 A1 * | 9/2019 | Shah ................ H04N 21/42203 | |
| 2019/0304507 A1 | 10/2019 | Leyfman et al. | |
| 2019/0339927 A1 * | 11/2019 | Gosu ................ H04N 21/4394 | |
| 2020/0073511 A1 * | 3/2020 | Li ................ H04R 1/025 | |
| 2020/0194004 A1 | 6/2020 | Bates | |
| 2021/0279233 A1 | 9/2021 | Lee et al. | |
| 2021/0392223 A1 * | 12/2021 | Coffman ................ G06F 1/3215 | |
| 2021/0405962 A1 * | 12/2021 | Mackay ................ H04N 21/4305 | |
| 2022/0053236 A1 * | 2/2022 | Wachter ................ H04N 21/47202 | |

(56) References Cited

U.S. PATENT DOCUMENTS

2022/0277727 A1* 9/2022 Mixter .................. H04L 51/224
2022/0351733 A1* 11/2022 Bates .................... H04L 67/306

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 14, 2021, issued in connection with U.S. Appl. No. 16/709,357, filed Dec. 10, 2019, 12 pages.
Notice of Allowance dated Mar. 4, 2022, issued in connection with U.S. Appl. No. 16/709,357, filed on Dec. 10, 2019, 9 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

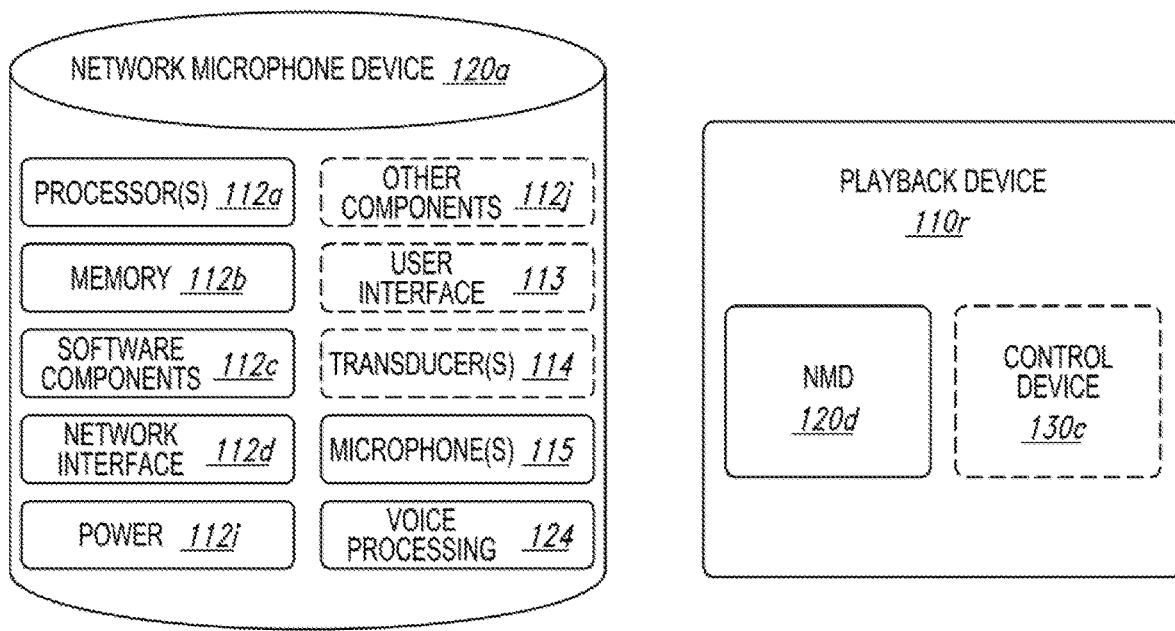
FIGURE 1F
FIGURE 1G
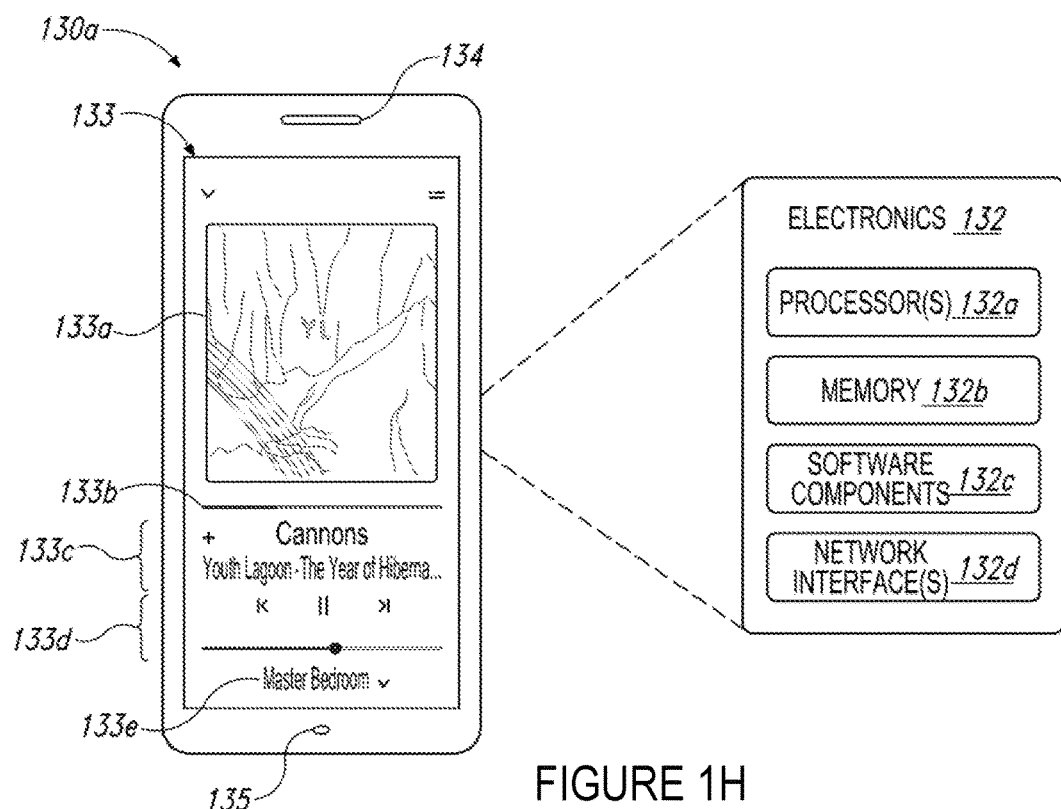
FIGURE 1H

GUEST ACCESS FOR VOICE CONTROL OF PLAYBACK DEVICES

CROSS-REFERENCE TO RELATED APPLICATIONS

The present application is a continuation of U.S. application Ser. No. 16/709,357, titled "User Specific Context Switching," filed on Dec. 10, 2019, and currently pending; U.S. application Ser. No. 16/709,357 claims priority to U.S. Prov. App. 62/778,512, titled "User Specific Context Switching," filed Dec. 12, 2018. The entire contents of U.S. application Ser. No. 16/709,357 and U.S. Prov. App. 62/778,512 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
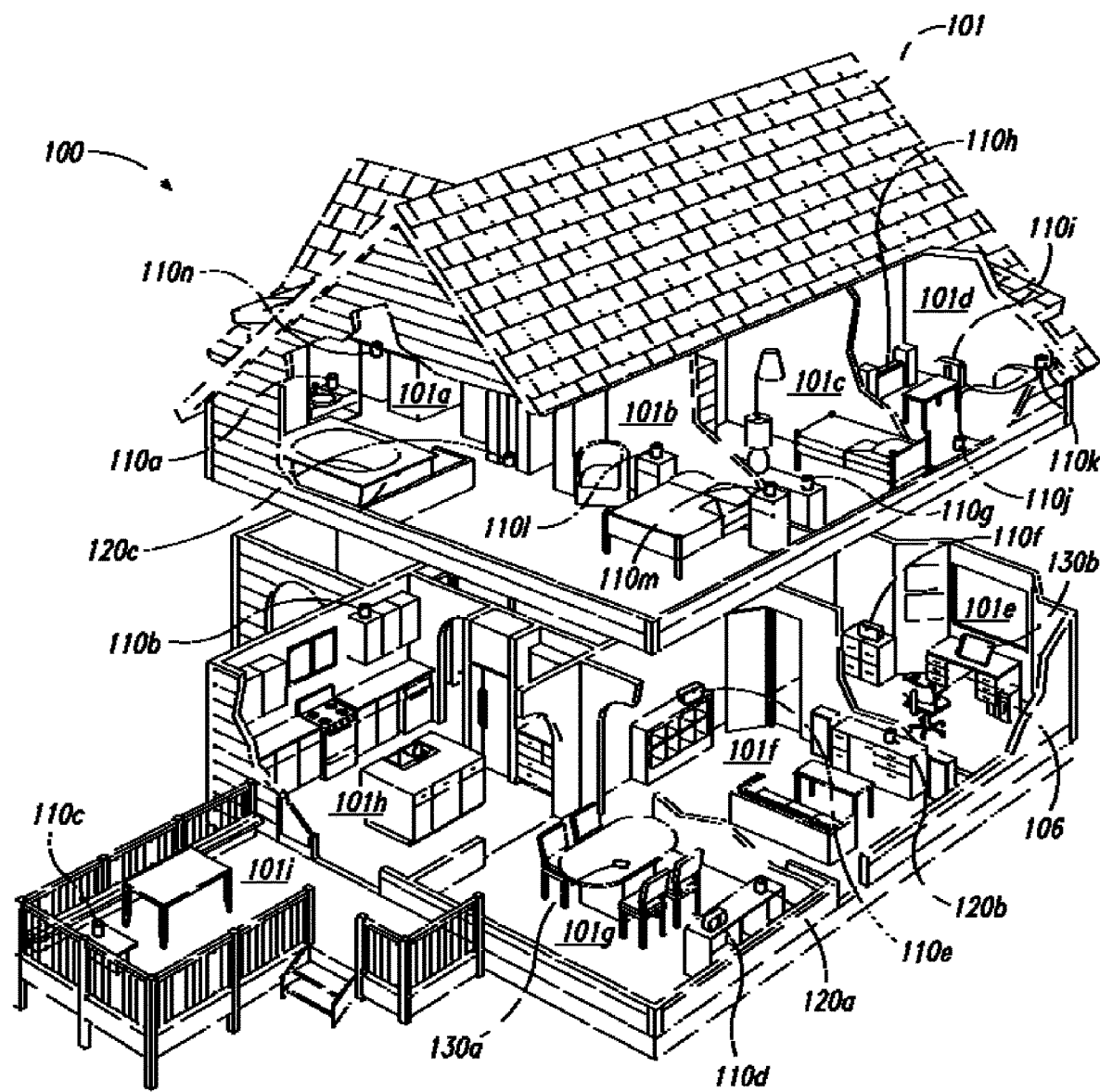
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Some embodiments described herein relate to configuring a playback device to use configuration data in multiple user profiles (including user-specific settings) of multiple users to process user commands based on which user issued the user commands. Some examples described herein improve functionality of playback devices by, among other advantages, reducing messaging between a playback device (or group of playback devices) and a cloud network and reducing steps to be taken by a playback device (or group of playback devices) when accessing user data from a cloud network. And for embodiments disclosed herein where a playback device is capable of running multiple voice assistant services (VAS) client applications (e.g., a VAS wake word detection engine), activating VAS client applications based on the specific users in the vicinity of the playback device as described here (rather than running all available VAS client applications concurrently) enables playback devices to operate more efficiently by reducing the computing load of the playback device's processors as explained further herein. Some examples described herein also improve functionality of playback devices by, among other advantages, enabling playback devices to seamlessly accommodate a variety of users, each having their own preferred VAS (or VASes) and media source (or media sources) in a variety of environments, e.g., private homes, offices, hotels, public spaces, private automobiles, public automobiles, and other environments. Although the various embodiments, examples, and variations thereof are described herein with reference to playback devices, the features and functions performed by the example playback devices, computing devices/systems, and user devices are equally applicable to any other type of computing device where it may be desirable to automatically configure the computing device (including entertainment devices, diagnostic devices, technical tools, and other computing devices) with user profile information for a user currently using the computing device, and where it may be further desirable to use at least some data in that user's profile to customize the operation of the computing device.

As explained in further detail below, a playback device may include, for example, a network interface, a speaker, and one or more processors. Additionally, the playback device may be configured to communicate with one or more server systems via one or more networks. The server systems may include stored sets of user configuration data associated with individual users. The user configuration for a specific user includes, among other data, the user's playback preferences, login/account credentials for various digital services such as VAS and/or media services, and/or other preferences for one or more VAS and/or one or more media services. In some embodiments, and as described further herein, the user configuration for a specific user may additionally contain playback context and/or other playback attributes for a specific item of media content that a user is listening to (or has recently listened to), e.g., a song, podcast, video, or other media content. For example, the playback context may include one or more of (i) an identification of the media content, (ii) if applicable, a point where playback of the media content was paused, (iii) the media playback service or other media information source from where the media content was obtained, (iv) whether the media content was requested by the user or another person, (v) whether the media content comprises audio, video, or both audio and video, and/or (vi) whether the media content was played in connection with a zone scene or other pre-configured playback arrangement.

In some embodiments, the playback device may detect one or more users within the presence of the playback device. The playback device may detect individual users, for example, by voice recognition. In another example, an individual user may have a computing device associated with the individual user (e.g. a smartphone, smart watch, or other device) and configured with software for controlling or at least communicating with the playback device, and in some embodiments, the playback device may detect an individual user by detecting that individual user's associated computing device.

In some cases, after detecting one or more users, the playback device may query a computing system (e.g., a cloud computing system) for each detected user's configuration data (or user profile). The playback device may then apply the configuration data for each detected user to the playback device, sometimes referred to herein as configuring the playback device with each detected user's configuration data. In some embodiments, once a playback device (or group of playback devices) has been configured with a detected user's configuration data, that playback device (or group of playback devices) uses that detected user's configuration data to process voice commands and/or playback media content. In some embodiments, a user profile for an individual user includes that individual user's configuration data for one or VASes, media services, and/or other user preference information, e.g., playback context and/or other playback attributes. And in some embodiments, configuring a playback device (or group of playback devices) with a detected user's configuration data includes loading and/or implementing that individual user's user profile on the playback device (or perhaps on one or more playback devices of a group of playback devices).

In some embodiments, using a detected user's configuration data to process a voice command includes sending a voice command (or portions thereof) to a voice assistant service (VAS) or other VAS with which the detected user is a registered user, or with which the detected user has a preexisting relationship, e.g., a VAS from Sonos®, the "Alexa" VAS from Amazon®, the "Siri" VAS from Apple®, the "OK Google" VAS from Google®, and/or any other VAS from any other VAS provider In embodiments where the detected user is a registered user of (or has a preexisting relationship with) multiple VAS services, using the detected user's configuration data to process a voice command includes sending the voice command (or portions thereof) to the detected user's preferred VAS of the multiple VAS services.

In some embodiments, using a detected user's configuration data to play media content includes requesting the media content from (and in some cases additionally obtaining the media content from) a media service, e.g., Spotify, Amazon Music, Apple Music, Google Play, Hulu, Netflix, HBO Now, or other media service with which the detected user is a registered user, or with which the detected user has a preexisting relationship. In embodiments where the detected user is a registered user of (or has a preexisting relationship with) multiple media services, using the detected user's configuration data to play media content includes requesting the media content from the detected user's preferred media service of the multiple media services, and in some cases, additionally obtaining the media content from the detected user's preferred media service.

In operation, and as described herein, playback devices according to some embodiments are configurable to detect multiple users and to use configuration settings (e.g., VAS and media service configurations and related preferences) of multiple detected users at the same time. In some embodiments, one or both of a playback device and/or a remote computing system (e.g. a cloud computing system) maintains a list of currently-detected users for the playback device, thereby enabling the playback device to use the user profiles of any currently-detected user to process voice commands and/or play media content.

In embodiments where a playback device loads and then executes multiple user profiles for multiple users concurrently, each additional user profile the playback device executes concurrently requires additional computing resources at the playback device. As a practical matter, there is an upper limit to the number of concurrent user profiles that an individual playback device can execute based on the computing capacity of the playback device's processors. Therefore, in some embodiments, a playback device is further configured to determine when a previously-detected user is no longer detected (i.e., no longer near the playback device), and in response to determining that the playback device can no longer detect the previously-detected user (or in response to otherwise determining that the user is no longer near the playback device), the playback device ceases executing that user profile (i.e., using that user's user profile to process voice commands and/or play media content). Ceasing to execute a user profile is sometimes referred to herein as deactivating a user profile.

For example, as described further herein, in some embodiments, activating a user profile includes executing a VAS wake word detection engine for one or more VASes specified in each detected user's profile. In the context of this disclosure, a VAS wake word detection engine is a computer program configured to analyze speech detected by one or more microphones of the playback device and identify a wake word for a specific VAS. When the playback device detects the wake word for the VAS, the playback device records the voice information following detection of the wake word and processes the recorded voice information locally and/or transmits the recorded voice information to the VAS for further processing to identify and execute voice commands. Examples of voice commands include, but are not limited to, commands to start and/or stop playback of media content, control smart devices (e.g., lights, thermostats, blinds), turn appliances on/off, lock/unlock doors, manage media content, manage media content libraries/queues/playlists, purchase items from retailers, schedule events in a calendar, send messages, begin/end communication sessions with other users, make reservations, and any other command or type of command that can be processed by a VAS.

In operation, each VAS wake word detection engine consumes computing resources at the playback device. In scenarios where a playback device can access any one or more of tens, hundreds, or even more different VASes, it would be impractical to execute a wake word detection engine for every possible VAS. By activating user profiles (and thereby executing corresponding VAS wake word detection engines) in response to detecting users, and deactivating user profiles (and thereby halting execution of corresponding VAS wake word detection engines) in response to no longer detecting a previously-detected user, some embodiments disclosed herein improve the functioning of a playback device by monitoring which users are nearby and only activating user profiles for users that are within the presence of the playback device. This enables a playback device to access any VAS available when necessary without requiring the playback device to run VAS wake word detection engines for a large number of different VASes.

In some embodiments, a playback device stores multiple user profiles (or at least portions of the user profiles) in local memory for quick access upon detecting certain users. For example, a playback device located in a private home, private office, or private automobile may store user profiles for 4 or 5 regular users. The playback device may store user profiles for additional users (e.g., a visiting friend, neighbor, or relative) for some period of time to facilitate quick loading. As a practical matter, there is an upper limit to the number of user profiles that an individual playback device can store in local memory based on the storage capacity of the playback device's local memory. Therefore, in some embodiments, in addition to ceasing to use a previously-detected (and no longer detected) user's user profile to process voice commands and/or play media content (i.e., deactivating a user profile), the playback device may additionally delete that previously-detected (and previously-active) user's user profile from local memory. In operation, the playback device deletes an inactive user profile from local memory after the playback device has failed to detect the user associated with the inactive user profile for some period of time, e.g., a few hours, a few days, a few weeks, a few months, or some other duration of time. By deleting a specific user profile from local memory in response to no longer detecting that specific user, some embodiments disclosed herein improve the functioning of a playback device by making efficient use of local memory. In some embodiments, a playback device may additionally or alternatively store up to a certain maximum number of inactive user profiles in local memory in a first-in-first-out manner.

In some embodiments described herein, a remote server or cloud computing system is configured to communicate with multiple playback devices to facilitate loading of a user's user profile (including playback context and other media playback attributes) onto different playback devices as the user moves between different locations where different playback devices are operating.

For example, a user may be listening to a podcast (or other audio content) via a first playback device located at his or her home. The user may pause the podcast as he or she is walking out to catch a cab or rideshare car. When a second playback device in the cab or rideshare car detects the user's presence, the second playback device obtains the user's profile, (e.g., from the cloud computing system or from the user's mobile device) and then the second playback device uses the user's profile to process voice commands and/or play media as described herein. For embodiments where the user profile includes media playback context information, the second playback device in the cab or rideshare car resumes playback of the podcast at the point where the first playback device at the user's home paused playback of the podcast (or other audio content). Similarly, when the user exits the cab or rideshare car, the second playback device pauses playback, and when the user arrives at his or office, at third playback device at the office resumes playback at the point where the second playback device in the cab or rideshare paused playback.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1 is a schematic view of a media playback system 100 distributed in an environment (e.g., a house). The media playback system 100 comprises one or more playback devices 102.

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

The playback device 102 is configured to receive audio signals or data from one or more media sources (e.g., one or more remote servers, one or more local devices) and play back the received audio signals or data as sound. In response to the received spoken word commands and/or user input, the media playback system 100 can play back audio via one or more of the playback devices 102. In certain embodiments, the playback devices 102 are configured to commence playback of media content in response to a trigger. For instance, one or more of the playback devices 102 can be configured to play back a morning playlist upon detection of an associated trigger condition (e.g., presence of a user in a kitchen, detection of a coffee machine operation).

a. Suitable Media Playback System

Figure 1B:
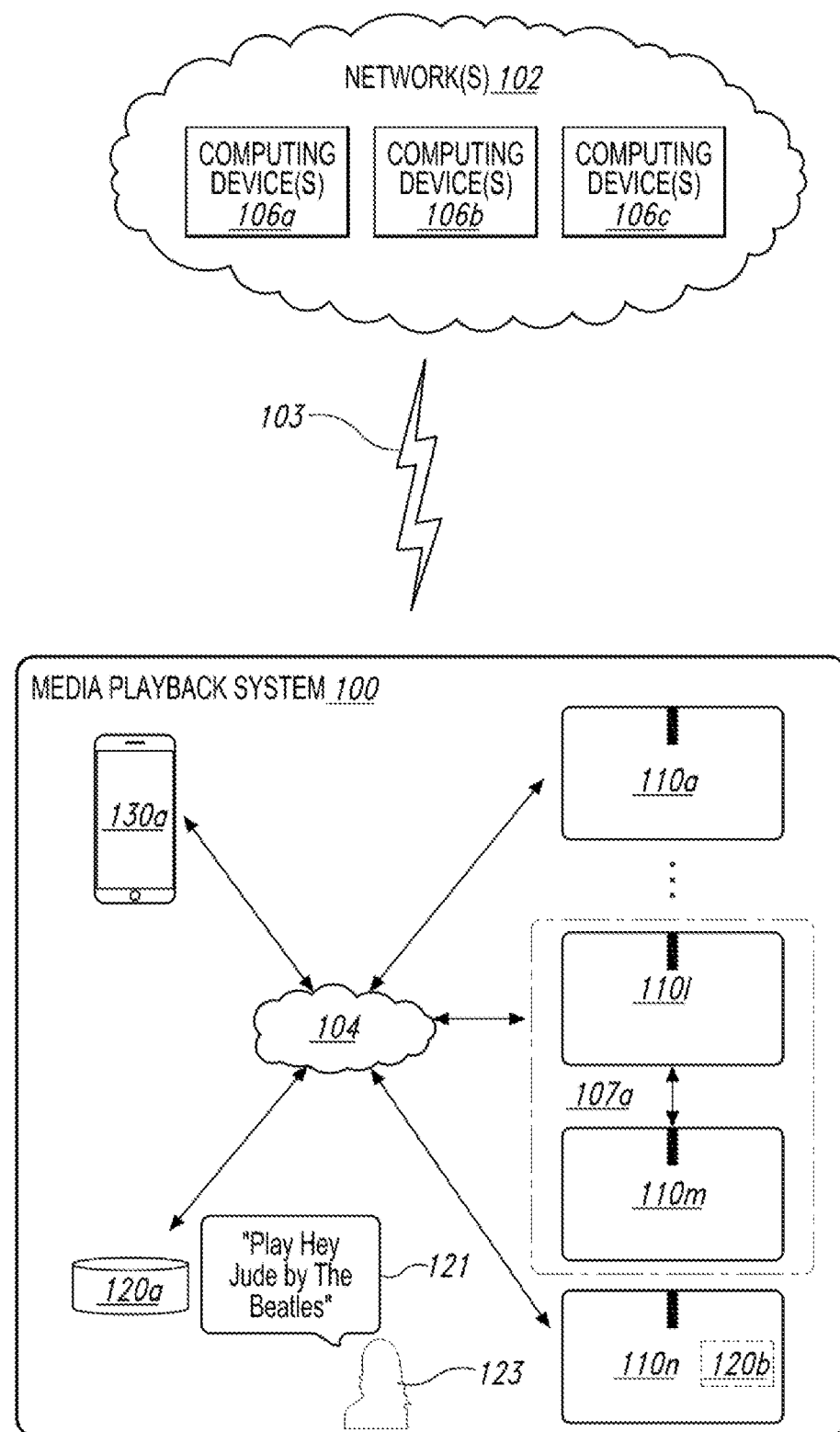
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
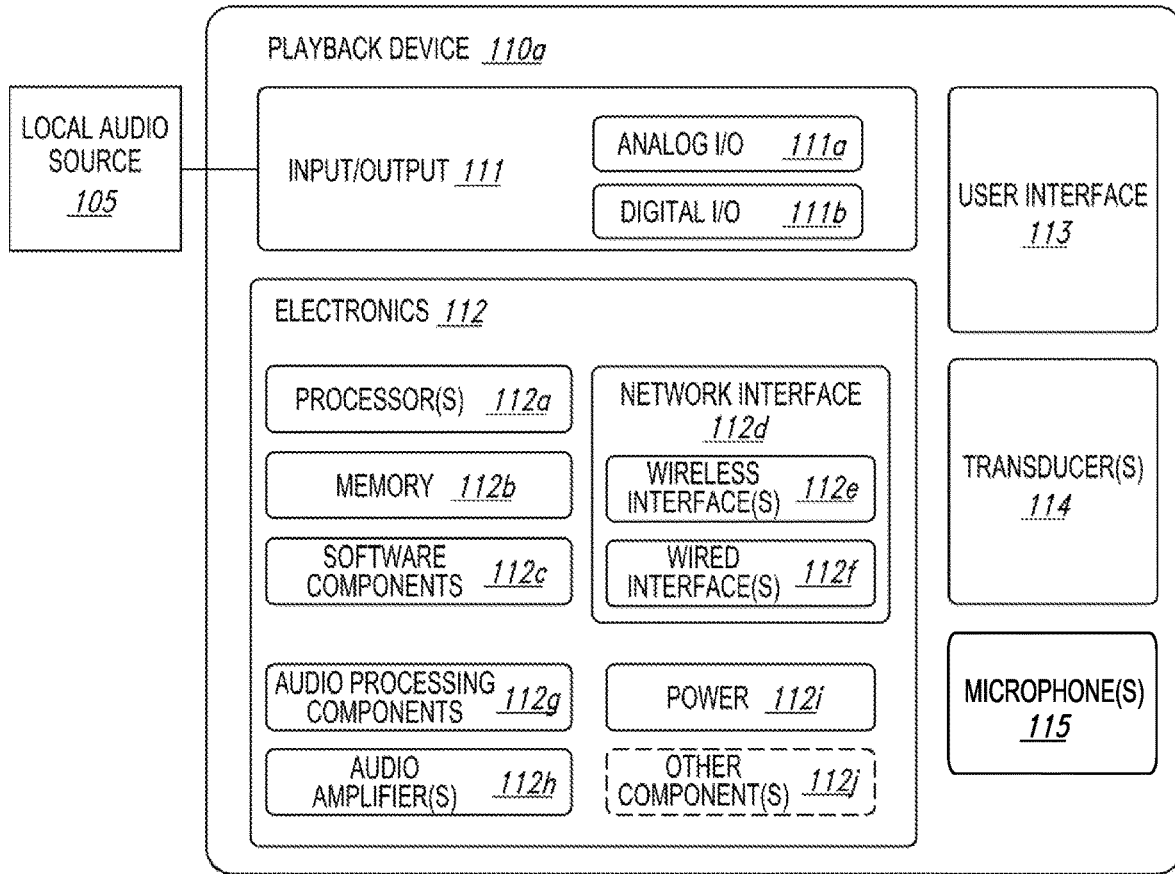
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
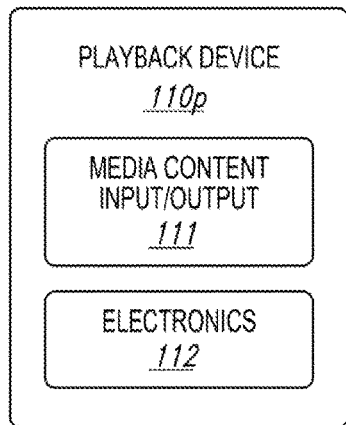
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
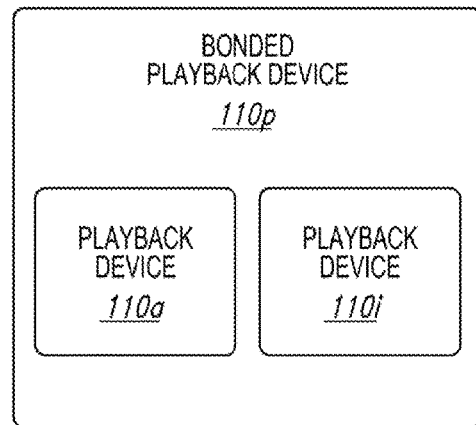
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Systems and Devices

Figure 2:
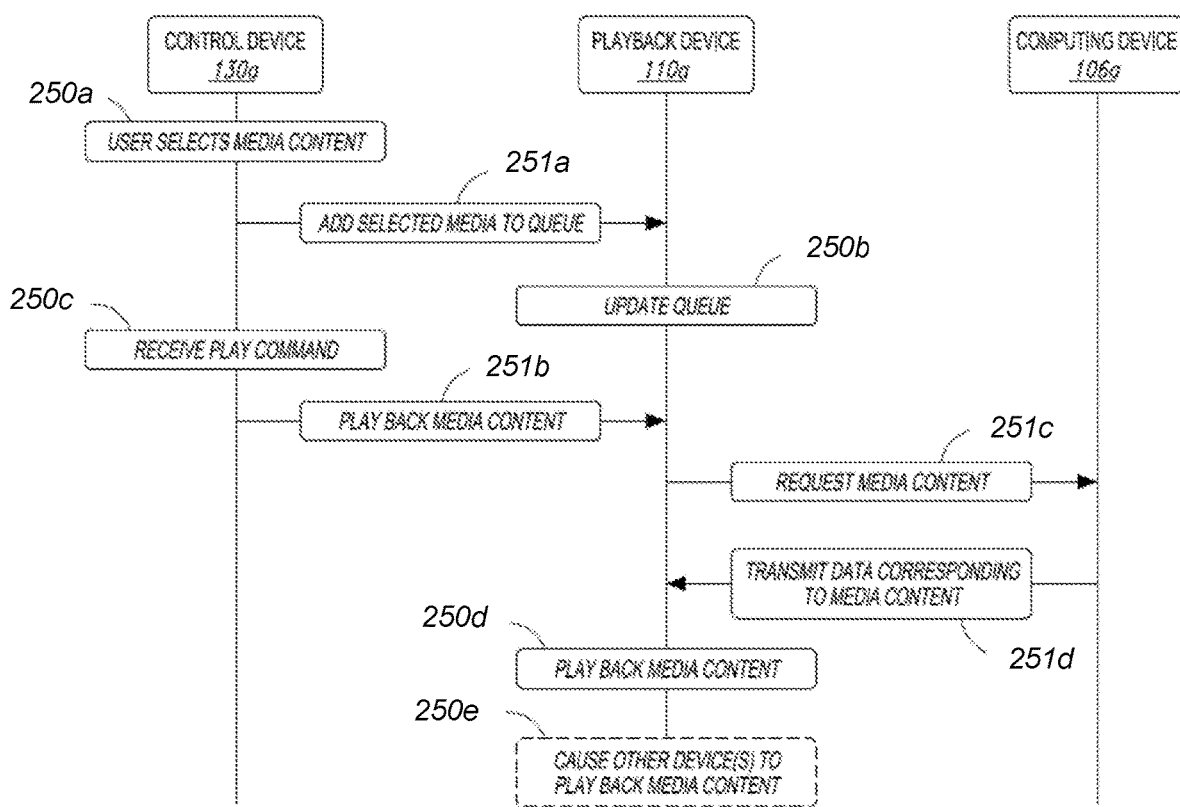
FIG. 2 is a message flow diagram of a media playback system.

FIG. 2 is a message flow diagram illustrating data exchanges between devices of the media playback system 100 (FIGS. 1A-1H).

At step 250a, the media playback system 100 receives an indication of selected media content (e.g., one or more songs, albums, playlists, podcasts, videos, stations) via the control device 130a. The selected media content can comprise, for example, media items stored locally on one or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 251a to the playback device 110a (FIGS. 1A-1C) to add the selected media content to a playback queue on the playback device 110a.

At step 250b, the playback device 110a receives the message 251a and adds the selected media content to the playback queue for play back.

At step 250c, the control device 130a receives input corresponding to a command to play back the selected media content. In response to receiving the input corresponding to the command to play back the selected media content, the control device 130a transmits a message 251b to the playback device 110a causing the playback device 110a to play back the selected media content. In response to receiving the message 251b, the playback device 110a transmits a message 251c to the computing device 106a requesting the selected media content. The computing device 106a, in response to receiving the message 251c, transmits a message 251d comprising data (e.g., audio data, video data, a URL, a URI) corresponding to the requested media content.

At step 250d, the playback device 110a receives the message 251d with the data corresponding to the requested media content and plays back the associated media content.

At step 250e, the playback device 110a optionally causes one or more other devices to play back the selected media content. In one example, the playback device 110a is one of a bonded zone of two or more players. The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. User Specific Context Switching

It is desirable in some circumstances for a playback device (or group of playback devices) to be configurable to use voice control settings, media playback settings, and/or other preferences for multiple users at different times and/or at the same time.

For example, it is desirable in some circumstances for a playback device (or group of playback devices) to dynamically (or at least substantially dynamically) and/or automatically (or at least substantially automatically) (i) detect that an individual user is (or multiple individual users are) within a proximity of (or otherwise near) the playback device (or group of playback devices) and (ii) in response to detecting each individual user, configure the playback device with that individual detected user's user profile, including but not necessarily limited to that user's voice assistant service (VAS) user credentials and/or preferences, media service user credentials and/or preferences, and other credentials and/or preferences to process voice commands received from that detected individual user and play media content from one or more media services with which the detected individual user has a user account. And for scenarios where the playback device detects multiple users, it is desirable in some circumstances for the playback device to selectively use the voice assistant service (VAS) user credentials and preferences, media service user credentials and preferences, and other credentials and preferences of any of the detected users to process voice commands and/or play media content in response to commands (voice commands, commands from a controller) from individual detected users.

Some example embodiments described herein are directed to playback device operation individually or in combination with one or more computing devices and/or computing systems based at least in part on the identity of individual users.

Figure 3:
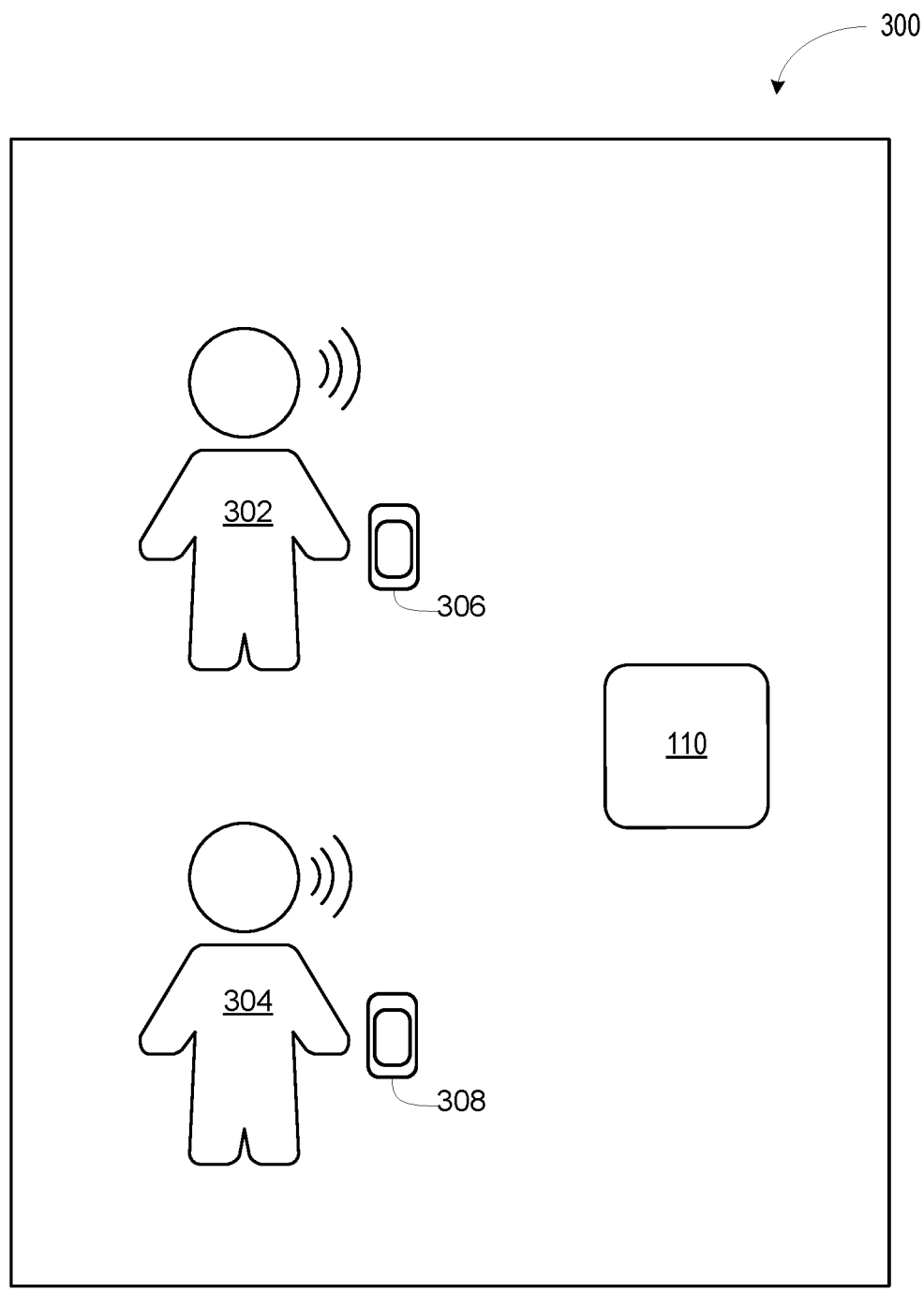
FIG. 3 is an environment of a media playback system for user specific context switching according to an example embodiment.

FIG. 3 show an environment 300 with a media playback system for user specific context switching according to example embodiments where a playback device 110 detects or otherwise determines that two different users are within proximity of (or otherwise near) a playback device 110, where the two different users are near the playback device 110 at the same time or at least during overlapping periods of time. Environment 300 shows an individual playback device 110 for illustrative purposes, but in some embodiments, playback device 110 is one of a group of two or more playback devices at a location.

In an example embodiment, a first user 302 and a second user 304 may be in the presence of the playback device 110. The users 302 and 304 have associated user configuration data which is specific to each user. In some embodiments, the configuration data for a user is stored in a user profile for that user. Configuration data in a user's user profile may include, for example, one or more of: (i) account or other login credentials for one or more voice assistant services (VAS), (ii) preferences for the one or more VAS services, (iii) account or other login credentials for one or more media services, (iv) playback settings for the one or more VAS and/or media services, (v) playback preferences for the one or more VAS and/or media services, and/or (vi) other information about the user or the user's associated VAS and/or media services that would be useful to the playback device 110 to facilitate processing voice commands, playing media content, and/or performing other functions relating to voice command processing, media playback, and/or media content management.

In some embodiments, the user's user profile may additionally include other voice control and media playback preferences such as preferred equalization settings for user (e.g., global equalization settings, media-specific equalization settings), preferred volume settings (e.g., max/min volume levels), alarm clock settings, do not disturb settings/timeframes, zone scenes, voice control wake words, voice response volumes and voices, media playlists, media favorites, and other preferences. For example, a user profile may include maximum or minimum volume levels associated with particular playlists. The user profile may also include alarms and other notifications, including the alarm sounds and specific types of notifications to be triggered in response to messages received from other applications and computing systems. The user profile may also include do not disturb settings that prevents the playback device from playing alarms and/or notifications during certain timeframes or while the playback device is playing certain media content or engaged in certain types of user interface exchanges with a user.

The user profile may also include a current playback queue for a user, such that, when the playback device is configured with the user's profile, the playback device obtains a copy of the user's current playback queue, including a queue playback point indicating where within the queue (including perhaps where within a particular media item) to resume playback of media in the queue. In addition to a current playback queue, the user profile may also include user-defined playlists, where the difference between a playback queue and a user-defined playlist is that the playback queue is a listing of songs that are queued for playback by the playback device (or set of playback devices) whereas a playlist is an organized listing of songs that that can be queued for playback (in response to a user command). For example, the playback queue may include individual songs, playlists, albums, etc. that are queued for playback, and a playback device configured with the playback queue will play the media in the playback queue in response to a play command from the user.

The user profile may additionally include playback context and/or other playback attributes for a specific item of media content that a user is listening to (or has recently listened to), e.g., a song, podcast, playback queue, playlist, video, or other media content. For example, the playback context may include one or more of (i) an identification of the media content, (ii) if applicable, a point where playback of the media content was paused, (iii) the media playback service or other media information source from where the media content was obtained, (iv) whether the media content was requested by the user or another person, (v) whether the media content is audio or video, (vi) for audio content, whether the audio content has associated video content, (vii) for video content, whether the video content has associated media content, and/or (viii) whether the media content was played in connection with a zone scene or other preconfigured playback arrangement. The playback context and/or playback attributes may take many forms, including but not limited to metadata and/or state data corresponding to or otherwise associated with a specific item of media content that is useful for transitioning playback of the media content from one playback device to another playback device.

Embodiments where the user profile includes one or more of the above-listed playback context and/or playback attributes enables a first playback device to pause playback of a specific item of media content at a particular point during playback and store that particular playback point for that specific item of media content in the user's user profile, which the first playback device shares with a cloud computing systems and/or the user's personal mobile computing device. Then, when the user is within the presence of a second playback device, the second playback device can obtain the user's profile (including the playback context information for that specific item of media content) from the cloud computing system and/or the user's personal mobile computing device. After obtaining the user's profile, the second playback device can use the playback context information to resume playback of that specific item of media content at the particular point during playback where the first playback device previously paused playback of that specific item of media content. Additionally, the second playback device can use playback attributes from the user's profile for playing back that specific item of media content, e.g., the playback volume that the first playback device was using to play back that specific item of media content, the equalization that the first playback device was using to play back that specific item of media content, the media source from where the first playback device was obtaining that specific item of media content, and other playback attributes.

The user profile may additionally include preferred media content sources and/or media services, including a hierarchical listing of preferred media sources/services. The user profile may additionally include certain "private" playback settings and "public" playback settings, for example, if the user does not wish for media content with explicit lyrics to play in a public setting. The user profile may additionally include voice signature data for the user that a playback device can use for detecting the user's voice or at least distinguishing the user's voice from another user's voice.

Any of the embodiments disclosed and described herein can use any one or more (or all) of the above-described user profile/user configuration information (and/or any of the user profile/user configuration described elsewhere herein) to process voice commands, playback media content, and/or perform other voice and/or media playback/management functions.

In operation, playback device 110 detects the first user 302 and the second user 304 in the presence of the playback device 110 in any one or more of a number of ways.

In some embodiments, the playback device 110 detects at least one of the first user 302 or the second user 304 by, for example, voice recognition. For example, if the playback device 110 has been previously configured with a user profile for the first user 302 and/or the second user 304 that includes a voice signature (or similar voice identification information), then the playback device 110 can use that voice signature (or similar voice identification information) to recognize the voice of the first user 302 and/or the second user 304.

Alternatively, the playback device 110 may detect a first user device 306 associated with the first user 302. The playback device 110 may be configured to detect the first user device 306 via, for example, periodically emitting a beacon via Bluetooth or Bluetooth Low Energy (BLE) or other suitable beacon or transmission that is detectable by a computing device (e.g., smartphone, tablet, smartwatch, etc.) associated with a user, and when the user's computing device detects the beacon/transmission, the user's computing device (i) responds to the playback device indicating the presence of the user and/or (ii) transmits one or more messages to a cloud computing system informing the cloud computing system that the user's computing device detected a beacon/transmission from a playback device, thereby causing the cloud computing system to send one or more messages to the playback device indicated in the transmission/beacon informing the playback device of the user's presence. Upon detection of (or at least after detecting) the first user device 306, the playback device 110 may download (or otherwise obtain) the first user's 306 user profile data from a server system, and then subsequently use configuration data from the first user's 306 user profile to process voice commands and/or play media as described herein.

In addition to the voice recognition and/or beacon methods described above, in some embodiments, the playback device 110 may additionally or alternatively detect the presence of one or more users (e.g., the first user 302 and/or the second user 304) through other ways, either individually or in combination with one or more other devices and/or cloud computing systems that are configured to detect and/or infer the presence of a person in general and/or specific users.

For example, if the playback device 110 is located in a home or office, the playback device 110 (individually or in combination with one or more other devices and/or cloud computing systems) may determine that a user is in the presence of the playback device 110 in response to receiving one or more notifications comprising any one or more of (i) a notification that the user has unlocked a door or entered the home or office via an electronic door lock or entry system, (ii) a notification that the user has disarmed an alarm system at the home or office, presumably after or just before entering the home or office, (iii) a notification that a camera-equipped doorbell system or other camera at the home or office has identified the user through facial recognition, (iv) a notification that the user opened a garage door at the home or office, (v) a notification that the user's private car or a taxi or rideshare car hired by the user has arrived at the home or office, (vi) a notification that a thermostat configured to detect the presence of people has detected the presence of a person likely to be the user, (vii) a notification that the user has logged in to a computer at the home or office, or that a computing device associated with the user has accessed a WiFi network (or other network) at the home or office, (viii)

a notification that the GPS location of the user's mobile computing device is inside the home or office, (ix) a notification from a calendar system that the user is scheduled to be at the home or office, and/or (x) any other notification from any other device or system in the home or office and/or associated with the home or office that can detect and/or infer the presence of a person in general and/or specific users.

Similarly, if the playback device 110 is located in an automobile (e.g., a private automobile, a taxi, a rideshare, or any other automobile), the playback device 110 (individually or in combination with one or more other devices and/or cloud computing systems) may determine that a user is in the presence of the playback device 110 in response to receiving one more notifications comprising any one or more of (i) a notification that the user has started the automobile with a key associated with the user, (ii) a notification that a seat and/or mirror setting associated with the user has been activated, (iii) a notification that the GPS location of the user's mobile computing device is the same as the location of the automobile, (iv) a notification that the automobile is being used (or soon will be used) to provide a taxi or rideshare ride to the user, (v) a notification that a camera in the automobile has identified the user through facial recognition, (vi) a notification that a computing device associated with the user has connected to an in-car network, and/or (vii) any other notification from any other device or system in the automobile or associated with the automobile that can detect and/or infer the presence of a person in general and/or specific users.

Additionally, if the playback device 110 is located in hotel room, the playback device 110 (individually or in combination with one or more other devices and/or cloud computing systems) may determine that a user is in the presence of the playback device 110 in response to receiving one or more notifications comprising any one or more of (i) a notification that the hotel room has been reserved by the user, (ii) a notification that the user unlocked a door or otherwise entered the hotel room via an electronic door lock or entry system, (iii) a notification that a camera-equipped entry system or other camera device or system at the hotel has identified the user through facial recognition, (iv) a notification that the user has arrived at the hotel, (v) a notification that the user's private car or a taxi or rideshare car hired by the user has arrived at the hotel, (vi) a notification that a thermostat configured to detect the presence of people has detected the presence of a person in the hotel room likely to be the user, (vii) a notification that the user has logged in to a computer at the hotel, or that a computing device associated with the user has accessed a WiFi network (or other network) at the hotel, (viii) a notification that the GPS location of the user's mobile computing device is inside the hotel and/or the hotel room, (ix) information from a calendar system indicating that the user is scheduled to be at the hotel and/or the hotel room, and/or (x) any other notification from any other device or system in the hotel, associated with the hotel, or otherwise able to detect and/or infer the presence of a person in general and/or specific users.

Further, if the playback device 110 is located in a public place (e.g., a restaurant, coffee shop, bar/lounge, building lobby, etc.), the playback device 110 (individually or in combination with one or more other devices and/or cloud computing systems) may determine that a user is in the presence of the playback device 110 in response to receiving one or more notifications comprising any one or more of (i) a notification that the user has made a reservation or a purchase at the public place, (ii) a notification that a camera at the public place has identified the user through facial recognition, (iii) a notification that the user has arrived at the public place, (iv) a notification that the user's private car or a taxi or rideshare car hired by the user has arrived at the public place, (v) a notification that the user has logged in to a computer at the public place, or that a computing device associated with the user has accessed a WiFi network (or other network) at the public place, (vi) a notification that the GPS location of the user's mobile computing device is at public place, (vii) receiving information from a calendar system indicating that the user is scheduled to be at the public place, and/or (viii) any other notification from any other device or system in public place, associated with public place, or otherwise able to detect and/or infer the presence of a person in general and/or specific users.

In some embodiments, receiving multiple notifications from multiple different systems may improve a level of confidence that the user is within the presence of a particular playback device.

In response to detecting the first and second users 302 and 304, or at least after detecting the first and second users (or perhaps during the process of detecting the first and second users 302 and 304), the playback device 110 may query one or more cloud computing systems (e.g., one or more computing device(s) 106 in FIG. 1B) to obtain sets of user configuration data (e.g., in the form of user profiles) for the first user 302 and the second user 304. After obtaining the configuration data from the one or more cloud computing systems, the playback device 110 uses the configuration data for the first user 302 and the second user 304 to process voice commands and/or play media content. In some embodiments, the playback device 110 may additionally or alternatively obtain at least some user configuration data from local memory at the playback device 110 if, for example, the playback device 110 has previously detected the user and obtained that user's configuration. In some embodiments, the playback device 110 may additionally or alternatively obtain at least some user configuration data from a computing device associated with the user, e.g., if the playback device 110 determined the presence of the user by detecting the user's computing device.

In some embodiments, to use the configuration data from a detected user's profile to process voice commands, the playback device 110 downloads, installs, and/or executes a particular VAS wake word detection engine for a VAS specified in the detected user's profile. For example, if the user profile for the first user 302 indicated that the first user 302 is a registered user of both a first VAS and a second VAS, then the playback device 110 downloads (if necessary) and executes a wake word detection engine for both the first VAS and the second VAS. And if the user profile for the second user 304 indicated that the second user 304 is a registered user of a third VAS, then the playback device 110 downloads (if necessary) and executes a wake word detection engine for the third VAS. In some embodiments, after the playback device 110 has downloaded (if necessary) and executed the first, second, and third VAS wake word detection engines in response to detecting the presence of both the first user 302 and the second user 304, the playback device 110 executes all three wake word detection engines concurrently. While the wake word detection engines for the first, second, and third VASes are running on the playback device 110, the playback device 110 is able to recognize wake words for any of the first, second, and/or third VASes spoken by either the first user 302 or the second user 304 (and perhaps other people in the same room as the playback device 110).

As mentioned earlier, some embodiments improve the operation of a playback device by only executing VAS wake word detection engines for VASes specified in user profiles of currently-detected users, which enables the playback device to provide access to a large number of different VASes while not having to execute wake word detection engines for every possible VAS all the time. In some embodiments, the playback device 110 is one of multiple playback devices located in the same room, e.g., 2, 3, 4, or more playback devices. For example, the playback device 110 may be in the same room (or car) as one or more additional playback devices, including a second playback device (not shown). If the first playback device 110 detects the first user 302 and the second user 304, the first playback device 110 can activate the user profile for the first user 302 (including executing one or more VAS wake word detection engines for the VASes indicated in the first user's 302 profile), and the first playback device 110 can additionally instruct the second playback device (not show) to activate the user profile for the second user 304 (including executing one or more VAS wake word detection engines for the VASes indicated in the second user's 304 profile). In this manner, the first playback device 110 (which may be configured as a master playback device for the group of playback devices in the room) distributes the processing load required to execute the multiple VAS wake word detection engines among multiple playback devices in the room.

In some examples, the first playback device 110 and the second playback device may be grouped, e.g., in a synchrony group, a stereo pair, a bonded playback device, and/or any other grouping disclosed herein, where the first playback device 110 is configured to assign VAS wake word detection processing to the second playback device (and perhaps additional playback devices depending on the size of the grouping). In operation, the playback device 110 in these examples is configured to play media content with the second playback device (not shown), so the group of playback devices can play back media content together in response to voice commands processed by any of the VASes with wake word detection engines running on either the first playback device 110 or the second playback device.

In other examples, the first playback device 110 and the second playback device may be in the same room, and the first playback device 110 may be configured to assign VAS wake word detection engine processing to the second playback device (and perhaps other playback devices in the room) even though the first playback device 110 and the second playback device may not be formally grouped into a synchrony group, stereo pair, or other formal grouping. In these embodiments, the playback devices in the room may be configured to generate responses to commands (e.g., replies from a VAS, confirmation sounds, etc.) together because both are working together to detect wake words (and process voice commands) for any of the VASes with wake word detection engines running on either the first playback device 110 or the second playback device, even though the first playback device 110 and the second playback device may not be configured to play media content together in a group-wise fashion.

Also, in some embodiments, to use the configuration data from a detected user's profile to play media content, the playback device 110 configures itself to access the media services identified in the detected user's profile. In some embodiments, the playback device 110 configuring itself to access the media services identified in the detected user's profile includes retrieving and using access tokens or other access mechanisms for one or more of the media services identified in the detected user's profile. For example, if the user profile for the first user 302 indicated that the first user 302 is a registered user of a first media service, then the playback device 110 configures itself to obtain media from the first media service via the first user's account credentials for the first media service. And if the user profile for the second user 304 indicated that the second user 304 is a registered user of both a second media service and a third media service, then the playback device 110 configures itself to obtain media from both the second media service and the third media service via the second user's 304 account credentials for the second media service and third media service, respectively. In some embodiments, after the playback device 110 has configured itself to access media from the first, second, and third media services after detecting the presence of both the first user 302 and the second user 304, the playback device 110 is able to access and obtain media from any of the first, second, or third media services.

In some embodiments, the playback device 110 detects the presence of the first user 302 and the presence of the second user 304 at the same time or substantially the same time, for example, when both the first user 302 and 304 arrive in a room (or other environment) where the playback device 110 is located. In some embodiments, the playback device 110 detects the presence of the first user 302, obtains the first user's 302 configuration data, and uses the first user's 302 configuration data to process voice commands and/or play media content. And then, while the first playback device is still configured to use the first user's 302 configuration data to process voice commands and/or play media content, the first playback device 110 detects the presence of the second user 304, obtains the second user's 304 configuration data, and uses the second user's 304 configuration data to process voice commands and/or play media content.

In operation, the first playback device 110 can selectively use either the first user's 302 configuration data or the second user's 304 configuration data to process voice commands and/or play media content, depending which of the first user 302 or the second 304 issues a voice command, a command to play media content, and/or a command to perform some other function related to processing voice commands and/or playing media content.

In some embodiments, either the first user 302 or the second user 304 may issue a user command to the playback device 110 after the first playback device 110 has been configured to selectively use either the first user's 302 configuration data or the second user's 304 configuration data for voice command processing and/or media playback or other media-related functions. A user may issue a command by, for example, speaking a voice command or entering a command via a user device 306-308 (e.g. a smartphone).

After receiving the user command, the playback device 110 then determines which of the first user 302 or the second user 304 issued the command. If the playback device 110 determines the first user 302 issued the command, the playback device 110 may process the user command according to the configuration data associated with the first user 302. If the playback device 110 determines the second user 304 issued the command, the playback device 110 may process the user command with the user configuration data associated with the second user 304.

In another example, the first user 302 or second user 304 may speak a voice user command to the playback device 110. In this example, the playback device 110 may have voice recognition data corresponding to each user 302-304 stored on the playback device 110 and process the voice command locally to determine which user issued the command. In such embodiments, the voice recognition data corresponding to an individual user may be included in the individual user's profile so that, once the playback device 110 is configured with an individual user's profile, the playback device 110 is configured to use the voice recognition data (e.g., voice signature or other voice recognition data) to determine that a spoken voice user command received at the playback device 110 originated from that individual user. For example, if the first user 302 issues the voice user command, the playback device 110 may perform a voice recognition algorithm to correlate the voice user command and the voice recognition data corresponding to the first user 302.

In a different example, in response to receiving a voice user command, the playback device 110 may send at least a portion of the voice data to one or more of the computing devices 106a-c (FIG. 1B) via the network 102 (FIG. 1B) for voice recognition. The one or more computing devices 106a-c (FIG. 1B) may then send an indication back to the playback device 110, thereby informing the playback device 110 as to which user 302-304 issued the command.

Another embodiment including voice user commands may involve using one or more third party voice recognition services to detect which of the first or second users spoke a voice user command.

In some embodiments, the configuration data associated with the first user 302 may identify a first voice service, which may be the first user's 302 preferred voice assistant service (VAS) or at least a VAS of which the first user is a registered user. And the configuration data associated with the second user 304 may identify a second voice service, which may be the second user's 304 preferred voice assistant service (VAS) or at least a VAS of which the second user is a registered user.

In some embodiments, the first voice service and the second voice may be different voice services. But in some embodiments, the first voice service and the second voice service may be the same voice service, but in such embodiments, the voice service uses the first user's configuration settings when processing commands from the first user, and the voice service uses the second user's configuration settings when processing commands from the second user. In some embodiments, the playback device 110 causes the first voice service to process a voice command (or at least a portion of the voice command) received from the first user 302 by transmitting at least a portion of the voice command received from the first user 302 to the first voice service. And the playback device 110 causes the second voice service to process a voice command (or at least a portion of the voice command) received from the second user 304 by transmitting at least a portion of the voice received from the second user 304 to the second voice service.

In some embodiments, a user may issue the user command via a user device, and in such embodiments, the playback device 110 receives the user command via the user device. In environment 300, the first user 302 has an associated first user device 306 and the second user 302 has an associated second user device 306. The first and second user devices 306-308 may be configured to communicate with the playback device 110. Example user devices may include a smartphone, a smartwatch, or a personal computer, among many other possibilities. In this example, determining which user 302-304 issued the command involves determining whether the playback device 110 received the user command from first user device 306 or whether the playback device 110 received the user command from the second user device 308.

In another example embodiment, the user command may include a media content request (e.g., "Play Hey Jude by The Beatles"). In response to receiving the media content request and, for example, determining the first user 302 issued the command, the playback device 110 may retrieve the media content (e.g., "Hey Jude" by The Beatles) from a media service identified in the first user 302 configuration data. If multiple media services are identified in the first user 302 configuration data, the playback device 110 may retrieve the media content from any of the identified media services or from a preferred media service if one of the identified media services is designated as the preferred media service in the first user 302 configuration data. Furthermore, if the media content is unavailable in the media service or services identified in the first user 302 configuration data, the playback device 110 may in some embodiments retrieve the media content from a media service or media services identified in the second user 304 configuration data and/or identified in user configuration data of any additional users that the playback device 110 has detected and whose user configuration data the playback device 110 is currently configured for use in processing voice commands and/or playing/managing media as described herein, i.e., any other "active" user profile.

Similarly, in response to receiving the media content request and determining the second user 304 issued the command, the playback device 110 may retrieve the media content from a media service identified in the second user 304 configuration. If multiple media services are identified in the second user 304 configuration data, the playback device 110 may retrieve the media content from any of the identified media services or from a preferred media service if one of the identified media services is designated as the preferred media service in the second user 302 configuration data. Furthermore, if the media content is unavailable in the media service or services identified in the second user 304 configuration data, the playback device 110 may in some embodiments retrieve the media content from a media service or media services identified in the first user 302 configuration data and/or identified in user configuration data of any additional users that the playback device 110 has detected and whose user configuration data the playback device 110 is currently configured for use in processing voice commands and/or playing/managing media as described herein, i.e. any other "active" user profile.

In yet another example involving media content requests, once the media content has been retrieved from the media service specified in either the first user 302 configuration data or the second user 304 configuration data (or any other active user profile), the playback device 110 may play back the requested media content via one or more speakers.

Later, and while the playback device 110 is playing back the requested media content (e.g., "Hey Jude" from the earlier example), either the first user 302 or the second user 304 may issue a second user command. The second user command may contain a second media content request (e.g., "Play Here Comes the Sun by the Beatles"). In response to receiving the second media content request, the playback device 110 in some embodiments may pause the first media content at a playback point of the first media content, where the playback point is at or near the time when the playback device 110 received and/or processed the second media content request. The playback device 110 may then retrieve the second media content (e.g., "Here Comes the Sun" by the Beatles) from either of the media services identified in the first user 302 configuration data or the media services identified in the second user 304 configuration data (in the same or substantially the same way as described above with reference to the user command to play "Hey Jude"). The playback device 110 may then play back the second media content via the one or more speakers.

Later, and while playing media content in response to the second media content request (or perhaps after completing playback of the media content in response to the second media content request), either the first user 302 or the second user 304 may issue a command to resume playing the first media content (e.g., "Hey Jude" by the Beatles). The playback device 110 in some embodiments may then resume playback of the first media content from the established playback point of the first media content. Additionally, the playback device 110 may, for example, play back the first media content from the established playback point of the media content via the one or more of speakers.

In some embodiments, the playback device 110 may maintain separate playback queues for each of the first user 302 and the second user 304. In some embodiments, the playback device 110 updates a user's playback queue as the playback device 110 plays media content in the playback queue. In such embodiments, the playback device 110 may additionally send regular messages with updates on the status of the user's playback queue (e.g., playback points, playback progress, and other updates) to one or both of (i) the user's user device (e.g., the first user device 306 for the first user 302), and where in response to receiving a status update on the user's playback queue from the playback device 110, the user device may additionally send an update to the cloud computing system(s) 106 (FIG. 1B), thereby causing the cloud computing system(s) 106 to update a copy (or version) of the user's playback queue stored at the computing system(s) 106; and/or (ii) the cloud computing system(s) 106, and where in response to receiving a status update on the user's playback queue from the playback device 110, the cloud computing system(s) 106 updates a copy (or version) of the user's playback queue stored at the computing system(s) 106.

Any of the embodiments disclosed and described herein can use any one or more (or all) of the above-described user playback queue management and update features and related messaging to update playback queues for individual users.

In some embodiments, while the playback device 110 is playing back the first media content from, for example, the first media service identified in the first user 302 configuration data, the playback device 110 may receive a request from the second user to add the first media content (e.g., "Hey Jude" by the Beatles) to, for example, a library, queue, or playlist associated with the second user 304. For example, the playback device 110 may receive a voice command from the second user 304 to "Add this song to my Spotify morning playlist" or the playback device 110 may receive a similar command from the second user 304 from the second user's 304 second user device 308. In another example, the playback device 110 may receive a voice command from the second user 304 to "Add this song to my playback queue," or the playback device 110 may receive a similar command from the second user 304 from the second user's 304 second user device 308. In response to receiving such a command, the playback device 110 may in some embodiments cause the first media content to be added to the library, queue, or playlist associated with the second user 304. The library, queue, or playlist associated with the second user 304 may be, for example, stored or accessible at the media service or media services identified in the second user 304 configuration data, and in such embodiments, causing the first media content to be added to the library, queue, or playlist associated with the second user 304 may include sending one or more messages to the media service(s) identified in the second user 304 configuration, where the messages instruct the identified media service(s) to add the media content to the library, queue, or playlist associated with the second user 304.

Figure 4:
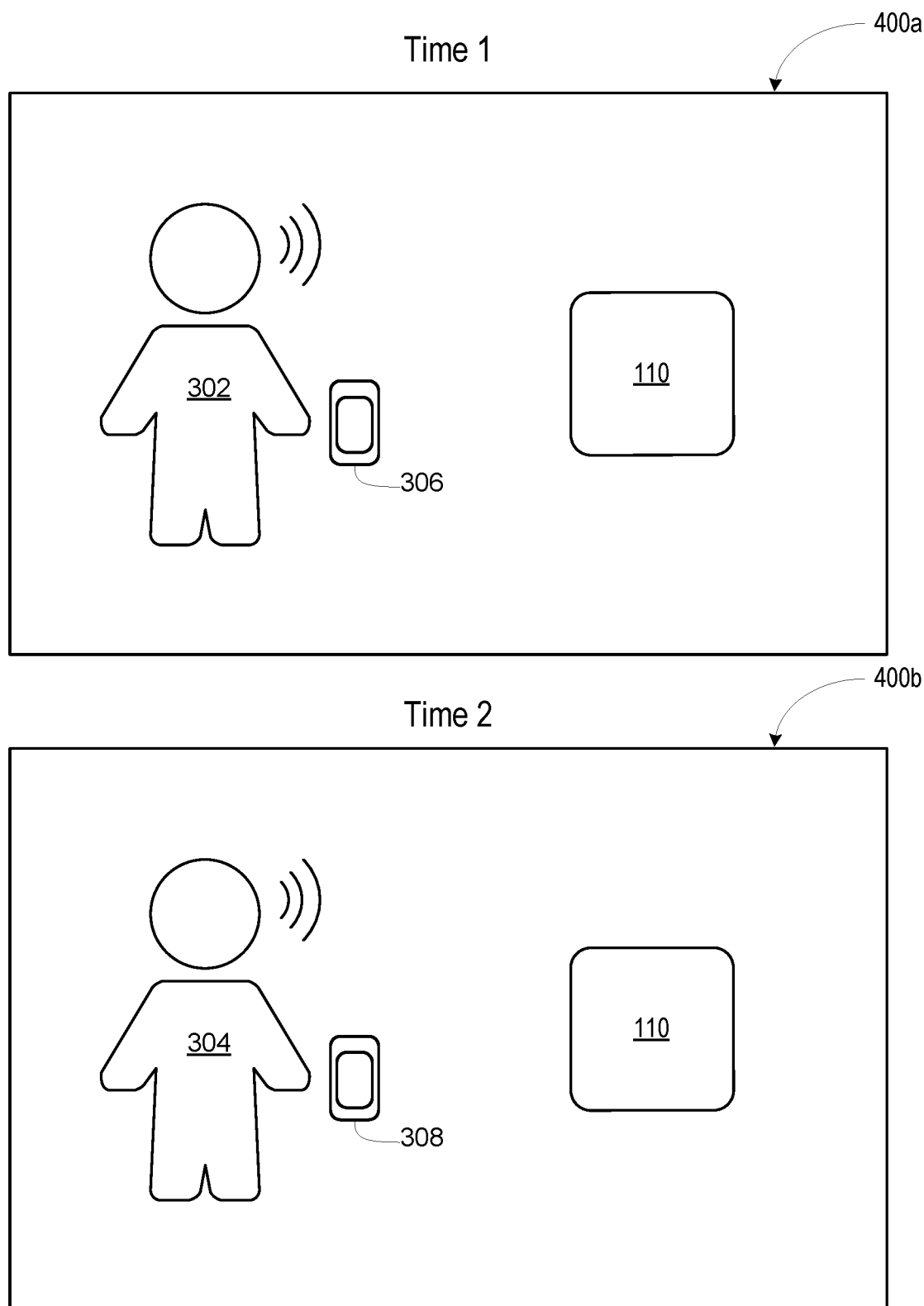
FIG. 4 is an environment of a media playback system for user specific context switching according to an example embodiment.

FIG. 4 is an environment of a media playback system for user specific context switching according to some embodiments. In an example embodiment, the first user 302 may be in the presence of the playback device 110 at a first time and the second user 304 may be within the presence of the playback device 110 at a second time.

For example, the playback device 110 may be within an environment 400a-b. The environment 400a-b may be a room in a house (e.g. a kitchen), a hotel room, or a car among many other possible examples. While the first user 302 is in the environment 400a during the first time, the playback device 110 may detect the first user. The playback device 110 may detect the first user 302 by, for example, voice recognition according to any of the examples disclosed and described herein.

Alternatively, the playback device 110 may detect the first user device 306 and associate the first user device 306 with the first user 302 according to any of the examples disclosed and described herein, including but not limited to detecting the first user device 306 via, for example, periodically emitting a beacon via Bluetooth or Bluetooth Low Energy (BLE) or other suitable beacon or transmission. In such embodiments, the first user device 306 detects the beacon that is periodically emitted by the playback device 110 and, and in response to detecting the beacon from the first playback device 110, the first user device 306 transmits an indication of the detected beacon to a cloud computing system (e.g., one of the computing systems 106a-c in FIG. 1B) associated with and/or in communication with the first playback device 110. In response to receiving the indication of the first playback device's 110 beacon from the first user device 306, the cloud computing system transmits one or more messages to the first playback device 110 to inform the first playback device 110 that the first user 302 (or at least the first user device 306 associated with the first user 302) is within a proximity of (or otherwise near) the first playback device 110.

In some embodiments, in response to detecting the beacon from the first playback device 110, the first user device 306 transmits the first user's 302 configuration data directly to the first playback device 110 rather than signaling to the computing system(s) 106 to cause the computing system(s) 106 to (i) transmit the first user's 302 configuration data to the first playback device 110 and/or (ii) configure the first playback device 110 to use the first user's 302 configuration data.

In some embodiments, in connection with detecting the first user device 306 and configuring the first playback device 110 to use the first user's 302 configuration data, the first playback device 110 may additionally send one or more messages to the first user device 306 with information (e.g., network identification, username, passwords, other user credentials (e.g., temporary credentials), and/or other registration and/or authentication information) that the first user device 306 uses to engage in further communications with the first playback device 110. For example, the beacon may contain simplified/streamlined identification information that the first user device 306 can use to establish a more robust user interface session with the first playback device 110. In some embodiments, the computing system(s) 106 may transmit the registration and/or authentication information to the first user device 306 in response to receiving an indication from the first user device 306 that the first user device 306 detected the first playback device's beacon (thus indicating that the first user device 306 is within the same area as the first playback device 110). And after receiving the registration and/or authentication information for the first playback device 110 from the computing system(s) 106, the first user device 306 configures itself to use the registration and/or authentication information to establish a user interface session with the first playback device 110. In some embodiments, the first user device 306 configures itself to use the registration and/or authentication information to establish a communication session with the first playback device (e.g., a background communication that is active but not necessarily be used by a user or by the user interface) so that, when the first user 302 launches a graphical user interface to interact with or control the first playback device 110, the first user device 306 can launch the graphical user interface and enable the first user 302 to control the first playback device 110 via the previously-established communication session.

Upon detection of the first user device 306, the playback device 110 may be configured to use the first user 302 configuration settings to process voice commands and/or control media playback. For example, in some embodiments, if the playback device 110 already has the first user's 302 user profile stored in local memory (because, e.g., the first user 302 has used the playback device 110 before in the past), then the first playback device 110 can activate (or reactivate) the first user's 302 user profile, or otherwise configure itself to use the configuration first user's 302 process voice commands and/or media playback commands. Similarly, in some embodiments, if the playback device 110 detects the first user 302 via voice recognition, beacon transmission, or other method, then the playback device 110 may download or otherwise obtain the first user's 302 user profile from a cloud computing system. For example, the cloud computing system may transmit the first user's 302 user profile (comprising the first user's configuration data) to the playback device 110, for example, in response to one or more of (i) receiving a request for the first user's 302 user profile from the playback device 110, (ii) receiving one or more messages from the first user device 306 indicating that the first user device 306 detected a beacon emitted by the playback device 110, (iii) receiving a request or command from another cloud computing system to transmit the first user's 302 user profile to the first playback device 110, or (iv) other requests and/or commands received from other computing devices.

Additionally, the first user 302 may leave the environment 400b at a second time, some time after the first time. In response to determining the first user 302 is no longer in the presence of the playback device 110 (i.e., the first user 302 left the kitchen), the playback device 110 may deactivate or remove the first user's 302 configuration data from its local memory, or otherwise discontinue using the first user's 302 configuration data to process voice and/or media playback commands. In some embodiments, after the playback device 110 detects a new user (e.g., second user 304) by any of the methods described herein, the playback device may attempt to confirm whether previously-detected users are still present.

In this manner, detecting a new user triggers or otherwise causes the playback device 110 to execute a user confirmation procedure to reconfirm whether any other users are still present. In some embodiments, reconfirming the presence of a previously-detected user may include sending one or more control messages to the previously-detected user's computing device via a LAN to determine whether the previously-detected user is still present. In some embodiments, the playback device 110 may query a LAN router to obtain a listing (e.g., a list of IP addresses) of computing devices currently connected to the LAN router and then compare the listing of currently registered computing devices with the user devices of previously-detected users (e.g., by comparing IP address or other identifying information). In some embodiments, the playback device 110 maintains an "active user" set of all the users that have been detected and/or re-confirmed. In some embodiments, the playback device 110 may additionally or alternatively re-confirm the presence of a previously-detected user after some amount of time, e.g., every few minutes, every half-hour, every hour, every few hours, or any other reasonable duration of time. In operation, the duration of time for a playback device in a public area (e.g., at a hotel, coffee shop, ride share car/taxi) may be shorter than the duration of time for a playback device in a private area (e.g., at a home, apartment, office, private car) because playback devices in publicly-accessible areas are likely to experience more transient users than privately-accessible areas. In some embodiments, to reconfirm the presence of a user, the playback device 110 continuously (or at least periodically) emits a beacon, and the user's user device detects the beacon. The user's user device can one or both (i) directly respond to the playback device to indicate to the playback device that it is still receiving the playback device's beacon (and thus, the first user is still near the playback device) or (ii) send one or more message to the cloud computing system 106 indicating that the user's user device detected the playback device's beacon, thereby causing the cloud computing system 106 to send one or more messages to the playback device indicating that the user's user device is still receiving the playback device's beacon (and thus, the first user is still near the playback device).

In some embodiments, the playback device 110 may be configured for a shorter or longer reconfirmation period. In some embodiments, the playback device 110 may adaptively reduce its reconfirmation period in response to detecting many new users over a short period of time. For example, if a playback device in a private home detects a sharp increase in newly-detected users (e.g., the homeowner has houseguests), then the playback device may reduce its reconfirmation period from, for example, reconfirming previously-detected users every few hours to reconfirming previously-detected users every few minutes. And once the rate of change in newly-detected users decreases (e.g., all the guests have arrived and guests do not appear to be coming and going), then the playback device may adaptively increase its reconfirmation period from, for example, reconfirming previously-detected users every few hours to reconfirming previously-detected users every half hour.

Later, after determining that the first user 302 is no longer in the presence of the playback device 110, the playback device 110 may detect the second user 306 at a second time in the presence of the playback device 110. In operation, the playback device 110 may detect the second user 304 in any of the ways of detecting a user (and/or the user's computing device) disclosed and described herein.

In some embodiments, the playback device 110 may alternatively be configured to deactivate the first user 302 configuration data upon detection of the second user 304. For example, in some embodiments, in response to determining that the second user 304 is in the presence of the playback device 110, the playback device 110 may discontinue using the first user's 302 configuration data to process voice and/or media playback commands. In such embodiments, the playback device 110 may be configured to process voice and/or media playback commands according to one user's configuration data at any point in time. This is in contrast to other embodiments disclosed and described herein where the playback device 110 may be configured to process voice and/or media playback commands according to multiple users in the presence of the playback device 110 (i.e., present users or "active" users as described herein), where the playback device 110 determines which of the present users issued a command (via voice or user device), and processes the command according to the configuration data of the present user that issued the command.

V. User Specific Context Switching Within Multiple Environments

It is also desirable in some circumstances for a cloud computing system to configure multiple playback devices to use an individual user's (or multiple individual users') voice control settings, media playback settings, and/or other preferences at different times and/or at the same time.

For example, it is desirable in some circumstances for one or more cloud computing systems (e.g., one of the computing systems 106*a-c* in FIG. 1B) to (i) store user profiles for an multiple individual users, where an individual user's user profile includes but is not necessarily limited to user configuration data for that individual user's voice assistant service (VAS) user credentials and preferences, media service user credentials and preferences, and other credentials and preferences to process voice commands received from that individual user and play media content from one or more media services with which the individual user has a user account and (ii) communicate with a plurality of playback devices (or groups of playback devices) to automatically (or at least substantially automatically) configure a playback device (or group of playback devices) when an individual user is (or multiple individual users are) within a proximity of (or otherwise near) (or otherwise near) the playback device (or group of playback devices). And for scenarios where more than one playback device (or groups of playback devices) is configured to use an individual user's configuration data/user profile at the same time, it is desirable in some circumstances for the playback device to remove and/or deactivate the individual user's configuration data from a playback device (or group of playback devices).

The following example embodiments describe computing devices and/or computing systems configuring settings of multiple playback devices (or groups of playback devices) based at least in part on the identity of the specific user or users within multiple environments.

Figure 5:
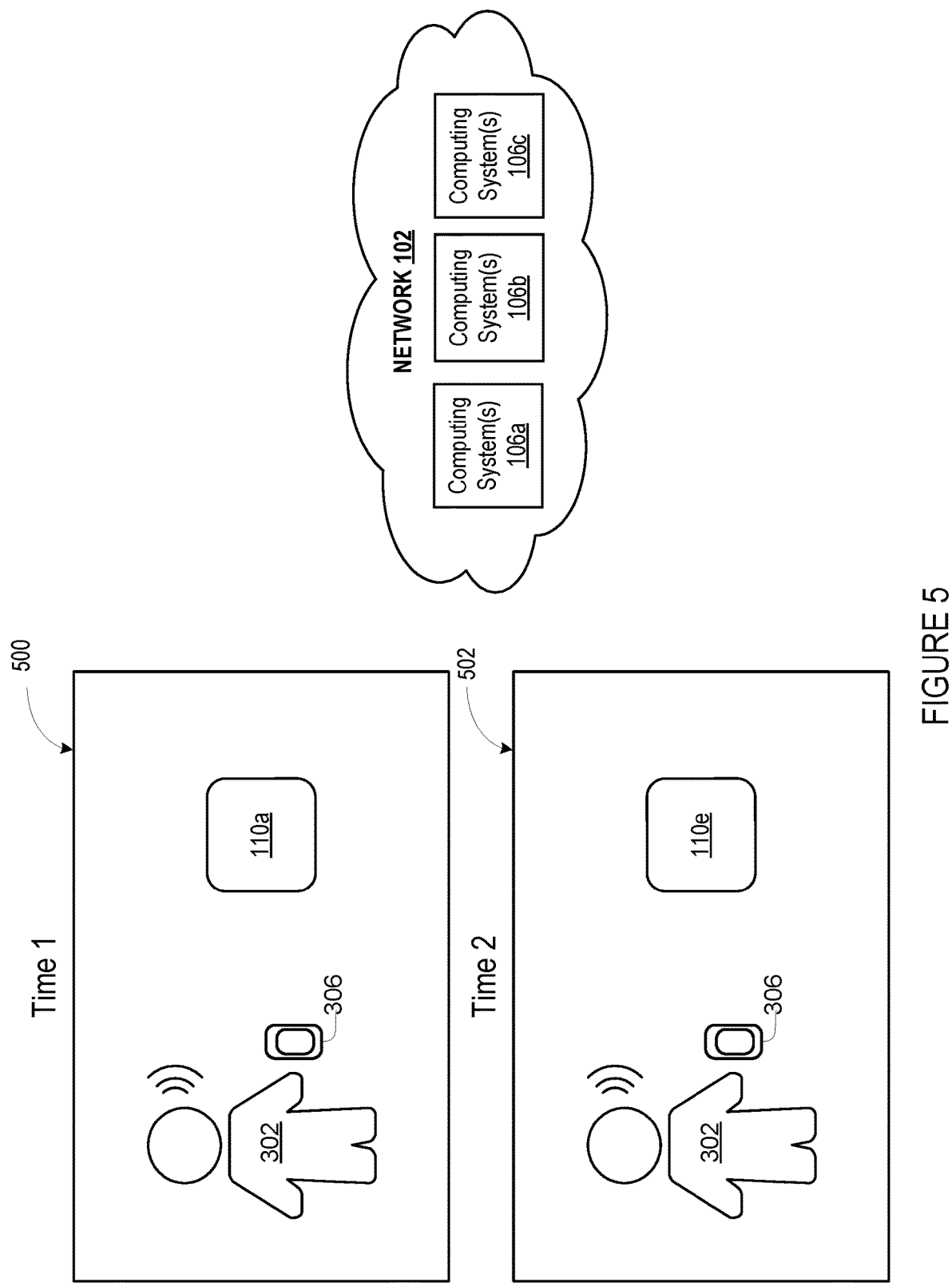
FIG. 5 is multiple environments of multiple media playback systems for user specific context switching according to an example embodiment.

FIG. 5 shows a first environment 500 containing a first media playback system 110*a* and a second environment 502 containing a second media playback system 110*e* for user specific context switching according to example embodiments where the one or more cloud computing systems 106 (individually or in combination with playback devices 110*a* and 110*e*) determines that an individual user is within proximity of the first playback device 110*a* at a first time and second playback device 110*e* at a second time, different than the first time.

In an example embodiment, the first playback device 110*a* and the second playback device 110*e* may communicate with one or more computing systems 106*a-c* via network 102. The computing system(s) 106 may store a plurality of sets of user configuration data, each associated with an individual user. As described previously, in some embodiments, the configuration data for a user is stored in a user profile for that user. Configuration data in a user's user profile may include, for example, one or more of: (i) account or other login credentials for one or more voice assistant services (VAS), (ii) preferences for the one or more VAS services, (iii) account or other login credentials for one or more media services, (iv) playback settings for the one or more VAS and/or media services, (v) playback preferences for the one or more VAS and/or media services, and/or (vi) other information about the user or the user's associated VAS and/or media services that would be useful to the playback devices 110*a* and 110*e* to facilitate processing voice commands, playing media content, and/or performing other functions relating to voice command processing, media playback, and/or media content management.

Via the network 102, the computing system(s) 106 may communicate with a plurality of playback devices (or groups of playback devices) including playback device 110*a* and playback device 110*e* located in two different environments 500 and 502, respectively. In some examples, one or both of the environments 500 and 502 may be private (e.g., a home or a personal car). Alternatively, one or both of the environments 500 and 502 may be public (e.g., a hotel room or a taxi). In some embodiments, one of the environments may be public and one of the environments may be private. A public environment may include environments where unknown or unrelated users may have access to the same playback devices. A private environment may include environments where known or related users may have access to the same playback devices.

In the example shown in FIG. 5, the first playback device 110*a* is within a first environment 500 and the second playback device 110*e* is within a second environment 502. In some examples, the second environment 502 may be within the same media playback system (e.g., the media playback system in FIG. 1A) as the first environment 500 (e.g., different rooms in a house). Alternatively, the second environment 502 may be separate from the first environment 500 (e.g., the first environment may be an apartment and the second environment may be a hotel room, or vice versa).

The first user 302 may be in the presence of the first playback device 110*a* at a first time. The first playback device 110*a* may detect the first user 302 according to any of the user detection methods described here. In some embodiments, the first playback device 110*a* detects the first user 302 by, for example, voice recognition. For example, if the first playback device 110*a* has been previously configured with a user profile for the first user 302 that includes a voice signature (or similar voice identification information), then the first playback device 110*a* can use that voice signature (or similar voice identification information) to recognize the voice of the first user 302.

Alternatively, the first playback device 110*a* may receive a voice request from the first user 302 to configure the first playback device 110*a* with the first user's 302 user profile. In response to receiving the voice request from the first user 302, the first playback device 110*a* transmits the voice request (or at least portions thereof) to one or more of the computing system(s) 106 for identification and/or verification. In response to receiving the voice request (or portions thereof) from the first playback device 110*a*, at least one of the computing systems 106 determines the identity of the first user 302 and, individually or in combination with one or more other computing system(s) 106, transmits the first user's 302 user profile comprising the first user's 302 configuration data to the first playback device 110a. In response to (or at least after) the receiving the first user's 302 configuration data, the first playback device 110a configures itself to use the first user's 302 configuration data to process voice commands, play media content, and/or perform other functions relating to voice command processing, media playback, and/or media content management as described herein. In some embodiments, in response to receiving the voice request (or portions thereof) from the first playback device 110a, at least one of the computing systems 106 determines the identity of the first user 302 and, individually or in combination with one or more other computing system(s) 106, configures the first playback device 110a to use the first user's 302 configuration data to process voice commands, play media content, and/or perform other functions relating to voice command processing, media playback, and/or media content management as described herein.

Alternatively, the playback device 110a may detect a first user device 306 associated with the first user 302. The playback device 110a may be configured to detect the first user device 306 via, for example, periodically emitting a beacon via Bluetooth or Bluetooth Low Energy (BLE) or other suitable beacon or transmission. In such embodiments, the first user device 306 detects the beacon that is periodically emitted by the first playback device 110a and, and in response to detecting the beacon from the first playback device 110a, the first user device 306 transmits an indication of the detected beacon to a cloud computing system (e.g., one of the computing systems 106a-c in FIG. 1B) associated with and/or in communication with the first playback device 110a. In response to receiving the indication of the first playback device's 110a beacon from the first user device 306, the cloud computing system transmits one or more messages to the first playback device 110a to inform the first playback device 110a that the first user 302 (or at least the first user device 306 associated with the first user 302) is within a proximity of (or otherwise near) the first playback device 110a.

In response to detecting or otherwise determining that the first user 302 and/or the first user device 306 are near the first playback device 110a, the first playback device 110a may query the computing system(s) 106 for the first user 302 configuration data (e.g., in the form of user profiles) for the first user 302, e.g., by sending one or more requests to the computing system(s) 106 via the network 102 and/or receiving one or more messages comprising the user profile/user configuration data from the computing system(s) 106 via the network 102. After obtaining the configuration data from the one or more cloud computing systems 106, the first playback device 110a uses the configuration data for the first user 302 to process voice commands and/or play media content. In some embodiments where the first playback device 110a may additionally or alternatively obtain at least some user configuration data from local memory at the first playback device 110a, the first playback device 110a may signal computing system(s) 106 that the first user 302 is in the presence of (or otherwise near) the first playback device 110a.

Alternatively, in response to detecting the beacon from the first playback device 110a, the first user device 306 may provide the first user's 302 configuration data directly to the first playback device 110a rather than (or perhaps in addition to) signaling to the cloud computing system(s) 106 to provide the first user's 302 configuration data to the first playback device 110a. In some embodiments, the first user device 306 transmitting the first user's 302 configuration data directly to the first playback device 110a may be faster (and require exchanging fewer control messages between the first user device 306, cloud computing system(s) 106, and first playback device 110a) than embodiments described above where the first user device 306 informs the cloud computing system(s) 106 that the first user device 306 received the beacon from the first playback device 110a, thereby causing the cloud computing system(s) 106 to configure the first playback device 110a with the first user's 302 configuration data (or at least causing the cloud computing system(s) 106 to transmit the first user's 302 configuration data to the first playback device 110a so that the first playback device 110a can configure itself to use the first user's 302 configuration data. To reduce the likelihood of unauthorized access to the first playback device 110a and/or unauthorized use of the first user's 302 configuration data in embodiments where the playback device 110a receives the first user's 302 configuration data directly from the first user device 306, the first playback device 110a may additionally perform a hash, checksum, or other sufficient verification procedure on the first user's 302 configuration data received from the first user device 306, and then transmit the results of the verification procedure to the cloud computing system(s) 106 to verify that the user configuration data received from the first user device 306 is consistent with the user configuration data for the first user 302 stored at the cloud computing system(s) 106. In operation, the cloud computing system(s) 106 compares the result of the verification procedure received from the first playback device 110a with a result of applying the same verification procedure to the version of the first user's 302 configuration data stored at the cloud computing system(s) 106. And if the result of the cloud computing system's 106 application of the verification procedure matches the result of the playback device's application of the verification procedure, then the cloud computing system(s) 106 confirms that the copy of the first user's 302 configuration data received from the first user device 306 is consistent with the copy of the first user's 302 configuration data stored at the cloud computing system(s) 106.

Alternatively, in some embodiments where the first user device 306 informs the cloud computing system(s) 106 that it received a beacon from the first playback device 110a, (i) the first user device 306 transmits the first user's 302 configuration data to the first playback device 110a, (ii) the cloud computing system(s) 106 applies the verification procedure to the copy of the first user's 302 configuration data to the first playback device 110a (rather than sending the first user's 302 configuration data to the first playback device 110a), (iii) the first playback device 110a applies the verification procedure to the copy of the first user's 302 configuration data received from the first user device 306, and (iv) the first playback device 110a compares the result of the verification procedure received from the cloud computing system(s) 106 with the first playback device's 110a result of applying the same verification procedure to the version of the first user's 302 configuration received from the first user device 306. And if the result of the cloud computing system's 106 application of the verification procedure matches the result of the playback device's application of the verification procedure, then the first playback device 110a confirms that the copy of the first user's 302 configuration data received from the first user device 306 is consistent with the copy of the first user's 302 configuration data stored at the cloud computing system(s) 106.

In some embodiments, if the verification result calculated by the first playback device 110a does not match the verification result calculated by the cloud computing system(s) 106, then the first user device 302 and the cloud computing system(s) 106 may exchange one or more messages to determine the differences (if any) between the version of the first user's 302 configuration data stored at the cloud computing system(s) 106 and the first user's 302 configuration data stored at the first user device 302. Alternatively, in some embodiments, if the verification result calculated by the first playback device 110a does not match the verification result calculated by the cloud computing system(s) 106, then the cloud computing system(s) 106 may one or more of: (i) instruct the first playback device 110a to not use the user configuration data received from the first user device 306, (ii) transmit the copy of the first user's 302 configuration data to the first playback device 110a (where the first playback device 110a subsequently uses the copy from the cloud computing system(s) 106 to configure itself to use the first user's 302 configuration data), (iii) configure the first playback device 110a to use the first user's 302 configuration data, and/or (iv) send a message to the first user device 306 prompting the first user 302 for further identification and/or authentication (e.g., username and/or password, Face ID, fingerprint scan, or other identification and/or authentication mechanisms) before proceeding to transmit a copy of the first user's 302 configuration data to the first playback device 110a and/or configuring the first playback device 110a to use the first user's 302 configuration data to process voice commands, play media content, and/or perform other functions relating to voice command processing, media playback, and/or media content management as described herein.

Any of the embodiments disclosed and described herein can use any one or more of (i) the above-described beacon/transmission-based user detection/identification procedures, (ii) the above-described the verification/authentication procedures, (iii) any of the beacon/transmission-based user detection/identification verification/authentication procedures described elsewhere herein and/or (iv) any of the verification/authentication procedures described elsewhere herein.

At a second time, some time later than the first time, the second playback device 110e may detect the first user 302 or the first user device 306 in the presence of (or otherwise near) the second playback device 110e according to any of the user detection methods described herein. In some embodiments, the second playback device 110e detects the first user 302 by, for example, voice recognition. For example, if the second playback device 110e has been previously configured with a user profile for the first user 302 that includes a voice signature (or similar voice identification information), then the second playback device 110e can use that voice signature (or similar voice identification information) to recognize the voice of the first user 302. Alternatively, the second playback device 110e may detect a first user device 306 associated with the first user 302. The second playback device 110e may be configured to detect the first user device 306 via, for example, periodically emitting a beacon via Bluetooth or Bluetooth Low Energy (BLE) or other suitable beacon or transmission. In such embodiments, the first user device 306 detects the beacon that is periodically emitted by the second playback device 110e and, and in response to detecting the beacon from the second playback device 110e, the first user device 306 transmits an indication of the detected beacon to a cloud computing system (e.g., one of the computing systems 106a-c in FIG. 1B) associated with and/or in communication with the second playback device 110e via the network 102.

In response to receiving the indication of the second playback device's 110e beacon from the first user device 306, the cloud computing system transmits one or more messages to the first playback device 110 to inform the first playback device 110 that the first user 302 (or at least the first user device 306 associated with the first user 302) is within a proximity of (or otherwise near) the second playback device 110e. The second playback device 110e may detect the first user 302 at the second time according to any of the other user detection methods disclosed and described herein, including but not limited to any of the methods described above with reference to the first playback device 110a detecting the first user 302 at the first time in scenario 500.

In response to detecting the first user 302 and/or the first user device 306, the second playback device 110e may also query the cloud computing system(s) 106 to obtain the first user 302 configuration data. (e.g., in the form of user profiles) for the first user 302. The second playback device 110e may additionally or alternatively obtain the first user 302 configuration data directly or indirectly from either the first user device 306 or the cloud computing system(s) 106 according to any of the methods described herein, including but not limited to any of the methods described above with reference to the first playback device 110a detecting the first user 302 at the first time in scenario 500.

After obtaining the configuration data from the one or more cloud computing systems 106 (and/or from the first user device 306), the second playback device 110e uses the configuration data for the first user 302 to process voice commands and/or play media content. In some embodiments where the second playback device 110e may additionally or alternatively obtain at least some user configuration data from local memory at the second playback device 110e, the second playback device 110e may signal the cloud computing system(s) 106 that the first user 302 is in the presence of (or otherwise near) the second playback device 110e.

In some examples, both the first playback device 110a and the second playback device 110e may be configured to use the first user 302 configuration data simultaneously or at least during different but overlapping time periods. This is desirable in some circumstances when both playback devices 110a and 110e are within a private environment or a media playback system 100, (e.g., two different rooms within a house). In this example, the first user 302 may move to different rooms of the house with the first user 302 configuration data configured on each playback device 110a and 110e. In some embodiments, however, configuring one playback device in a media playback system causes all of the playback devices in that media playback system to be configured with the same user configuration data/user profiles.

Alternatively, in other examples, in response to determining the first user 302 is in the presence of (or otherwise near) the second playback device 110e at a second time, the one or more cloud computing systems 106 may transmit instructions to the first playback device 110a to deactivate the first user 302 configuration data or at least discontinue using the first user 302 configuration data to process voice commands and/or playback/manage media content. This is desirable in some circumstances when users are switching from public to private environments or from public to public environments. For example, the first playback device 110a may be within the first environment 500 which is a taxi, and the first user 302 may be listening to music for the duration of the taxi ride. The first user 302 may then exit the taxi and arrive in the second environment 502 with the second playback device 110e. Once the first user 302 is detected by the second playback device 110e in the second environment 502, the cloud computing system(s) 106 may signal the first playback device 110a in the taxi to remove the first user's 302 configuration data from the first playback device 110a or otherwise disable or de-configure the first playback device 110a from using the first user's 302 configuration data to process voice and/or media playback/management commands. This is desirable in some circumstances to prevent unrelated parties (i.e., new taxi customers) from having access to or otherwise make use of the first user's 302 configuration data on the first playback device 110a if the first user's 302 configuration data is not removed from the first playback device 110a, or if the first playback device 110a is not otherwise de-configured to use the first user's 302 configuration data.

Similarly, in some examples the cloud computing system(s) 106 may signal the first playback device 110a to deactivate the first user's 302 configuration data if, at some time after the first time and before the second time, the first user 302 is no longer detected in the first environment 500 by the first playback device 110a. For example, the first playback device 110a may detect the first user device 306 and associate the first user device 306 with the first user 302 according to any of the examples disclosed and described herein, including but not limited to detecting the first user device 306 via, for example, periodically emitting a beacon via Bluetooth or Bluetooth Low Energy (BLE) or other beacon or transmission. In the first environment 500 of a taxi, for example, once the first user device 306 is no longer detected by the first playback device 110a in the taxi, the first user 302 configuration data can be removed. As noted above, removal of the user configuration data may be desirable to limit unknown, unrelated, or other third party access to the first user's 302 configuration data.

Additionally, the first playback device 110a may prompt the first user 302 if, for example, the first playback device 110a no longer detects the first user 302 and/or the first user device 306. In some examples, if the first playback device 110a has not detect the first user's 302 voice signature for a certain period of time after the first time, the first playback device 110a may prompt the first user 302 by outputting, for example, a question (e.g., "John, are you still there?") via the speaker(s) (e.g., 114 in FIG. 1C). In response to the first user 302 responding positively to the prompt (e.g., "Yes"), the first playback device 110a may, for example, resume playing back audio content or continue to process commands according to the first user's 302 configuration data. The first playback device 110a also may then signal the cloud computing system(s) 106 indicating that the first user 302 is still within the presence of (or otherwise near) the first playback device 110a. If no response is detected or a negative response is detected, the first playback device 110a may remove the first user's 302 configuration data from the first playback device 110a or otherwise cease using the first user's 302 configuration data to process voice and/or media playback/management related commands. In some embodiments, the first playback device 110a may additionally or alternatively employ the reconfirmation procedures disclosed and described above and/or any of the reconfirmation procedures disclosed elsewhere herein. After determining that the first user 302 is no longer present (or perhaps in response to determining that the first user is no longer present), the first playback device 110a also may signal the computing system(s) 106 indicating that the first user 302 is no longer within the presence of (or otherwise near) the first playback device 110a.

Alternatively, the first playback device 110a may signal the computing system(s) 106 to prompt the first user device 306 to ask the first user 302 whether the first user 302 is still in the presence of (or otherwise near) the first playback device 110a. For example, a prompt or other notification may appear on the first user device 306 by way of an application previously installed on the first user device 306. In response to the first user 302 responding positively to the prompt (e.g., selecting an option in the prompt or in the application indicating the first user 302 is still within the presence of (or otherwise near) the first playback device 110a), the first user device 306 may send one or more messages to the computing system(s) 106 to indicate that the first user 302 is still within the presence of (or otherwise near) the first playback device 110a. In response to receiving the one or more messages from the first user device 306 indicating that the first user 302 is still within the presence of (or otherwise near) the first playback device 110a, the computing system(s) 106 may in turn send one or more messages to the first playback device 110a confirming that the first user 302 is still within the presence of (or otherwise near) the first playback device 110a. An in response to receiving the one or more messages from the computing system(s) 106 confirming that the first user 302 is still within the presence of (or otherwise near) the first playback device 110a, the first playback device 110a may, for example, resume playing back audio content or continue to process commands according to the first user's 302 configuration data. If no response is detected or a negative response is detected, the first playback device 110a (individually or in cooperation with the first user device 306 and/or computing system(s) 106) may remove the first user's 302 configuration data from the first playback device 110a, or otherwise cease using the first user's 302 configuration data to process voice and/or media related commands. The first playback device 110a also may then signal the computing system(s) 106 indicating that the first user 302 is no longer within the presence of (or otherwise near) the first playback device 110a.

Similarly, the first playback device 110a may pause play back of the first media content and establish a playback point when the first user 302 is for example, no longer detected in the presence of (or otherwise near) the first playback device 110a, the first user 302 is detected in the presence of (or otherwise near) the second playback device 110e, or the first user 110a issues a command to the first playback device 110a to pause the first media content. The first media content may later be resumed from a different playback device at the point of the playback point. For example, if the first user 302 is listening to an audiobook on the first playback device 110a and later leaves the first environment 500 or commands the first playback device 110a to pause the first media content, the first playback device 110a may establish a playback position of the audiobook. A playback position may be at or near the point in the first media content (e.g. at a particular page in an audiobook) when the first user 302 commands the first playback device 110a to pause the first media content or the first user 302 and/or first user device 306 is no longer detected by the first playback device 110a. The first playback device 110a may transmit this playback position to the computing system(s) 106 via the network 102 to be stored in the first user's 302 configuration data. Later, the first user 302 may be able to resume the audiobook from the playback position on the second playback device 110e or another playback device configured to communicate with computing system(s) 106 via the network 102. In such embodiments, the first user 302 is able to continue playback of the same media content across multiple playback devices as the first user 302 moves from a first environment with a first playback device to a second environment with a second playback device.

Although the example in FIG. 5 shows two playback devices in two corresponding environments during two timeframes, the features and functions described herein with regard to two playback devices in two corresponding environments during two timeframes are equally applicable to three, four, or many more playback devices in three, four, or many more corresponding environments during three, four, or many more timeframes.

In some examples, the first user 302 configuration data may include different playback preferences or other configuration settings for private environments than for public environments. Additionally, different types of private environments may have different playback preferences and/or other configuration settings for a specific user. For example, a user may have different playback preferences and/or other configuration settings for playback devices at his or her home as compared to the playback preferences and/or other configuration settings for playback devices at the user's office or at the user's friend's home, even though all three environments might be considered private environments.

Different playback preferences and/or other configuration settings are desirable in some circumstances where the user, for example, listens to one genre of music (e.g. country music) in private environments and another genre of music (e.g. jazz music) in public environments. In some examples, the computing system(s) 106 may recognize which playback devices are in private environments and which are in public environments. For example, playback devices may have settings to indicate whether the environments are public or private and transmit this setting to the computing system(s) 106 via the network 102. The computing system(s) 106 may then configure a playback device in a private environment to use the first user's 302 "private" configuration data (which may be a subset of the first user's 302 configuration data). Similarly, the network 102 may configure a playback device in a public environment to use the first user's 302 "public" configuration data (which may be a subset of the first user's 302 configuration data).

In some examples, a plurality of users (i.e., family members of a home) may interact with the first playback device 110a. The first playback 110a may store voice data from each user and establish voice signatures associated with each of the individual users. For example, the first user 302 may issue a voice user command to the first playback device 110a. The first playback device 110a may then compare the voice data of the voice command with the voice signatures of the plurality of users. The first playback device 110a may then determine that the first user 302 issued the voice user command and configure the first playback device 110a to use the first user 302 configuration data according to any of the examples disclosed and described herein.

Similarly, the computing system(s) 106 may store the established voice signatures of all the plurality of users that interact with any playback device within a media playback system (e.g., the media playback system 100 in FIG. 1A), for example family members in a home with at least two playback devices. In this example, the first playback device 110a and the second playback device 110e may be within a media playback system 100. The first playback device 110a may have previously established a voice signature of the first user 302. The first user 302 may then issue a voice command in the presence of (or otherwise near) the second playback device 110e. The second playback device 110e may then access the voice signatures associated with the media playback system 100 to determine that the first user issued the voice user command. The second playback system 110e may then be configured to use the first user 302 configuration data according to any of the examples disclosed and described herein.

In some embodiments where the first playback device 110a and the second playback device 110e are part of the same media playback system, the first playback device 110e may transmit the first user's 302 configuration data to the second playback device 110e via a LAN connection after the first playback device 110a receives the first user's 302 configuration data from the computing system(s) 106. In some embodiments, after the first playback device 110a receives the first user's 302 configuration data from the computing system(s) 106, the first playback device 110a may instruct the second playback device 110e to request (or otherwise obtain) the first user's 302 configuration data from the computing system(s) 106. And in some embodiments, the computing system(s) 106 may configure both the first playback device 110a and the second playback device 110e (and any other playback devices in the same media playback system) to use the first user's 302 configuration data in response to any one of the playback devices in the same media playback system detecting the presence of the first user 302 in any of the user detection methods disclosed herein.

Figure 6:
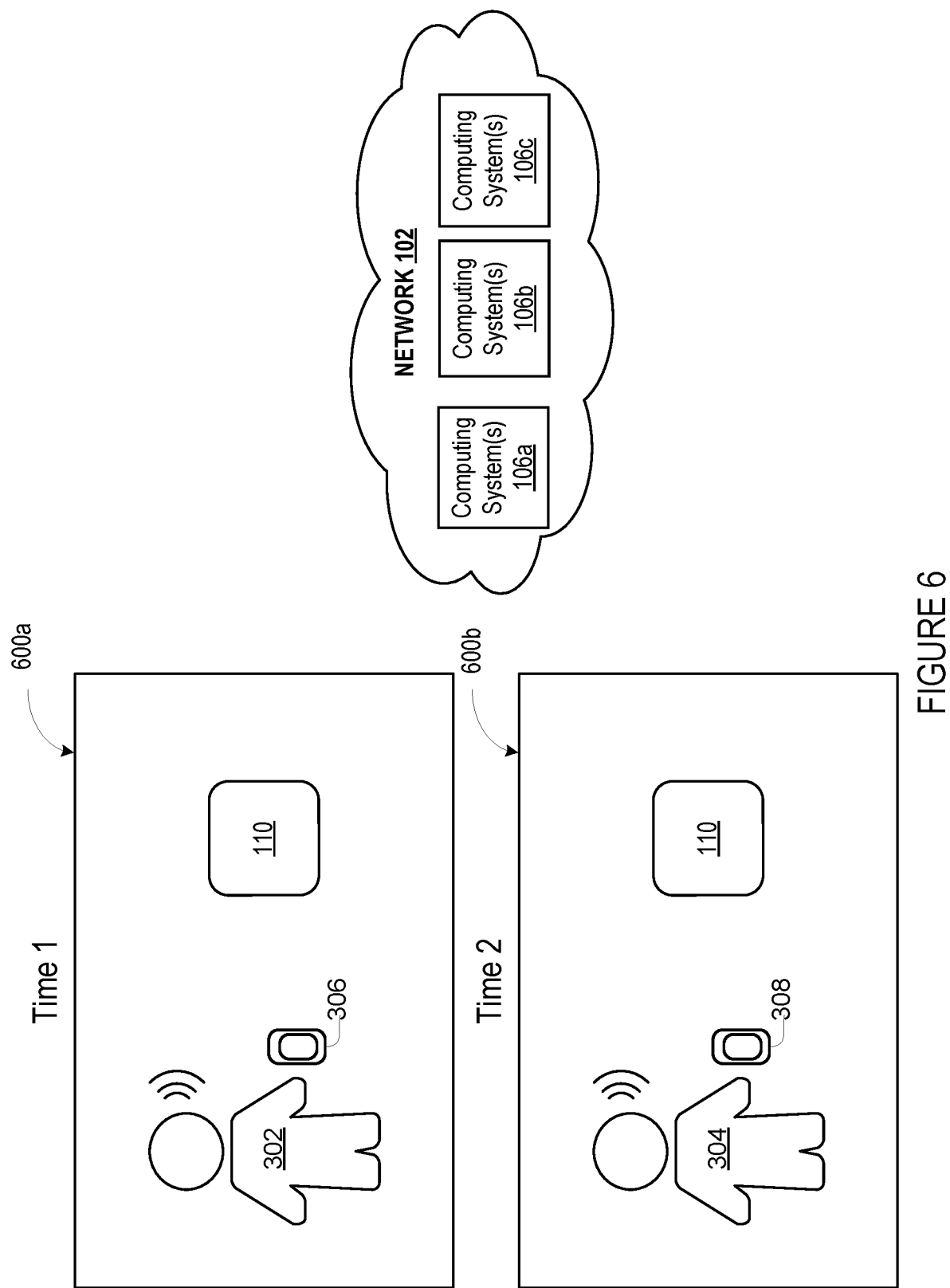
FIG. 6 is an environment of media playback systems for user specific context switching according to an example embodiment.

FIG. 6 shows an environment with media playback systems for user specific context switching according to some example embodiments. In such example embodiments, the first user 302 may be in the presence of (or otherwise near) a playback device 110 at a first time and the second user 304 may be within the presence of (or otherwise near) the same playback device 110 at a second time. Configuring the same playback device 110 with user configuration data of different users at different times is particularly desirable when the playback device 110 is in a public environment, e.g., a taxi, coffee shop, hotel, or other location where users tend to come and go.

In some embodiments, the playback device 110, in a first environment at a first time 600a may detect the first user 302 in the presence of (or otherwise near) the playback device 110. The playback device 110 may detect the first user 302 by, for example, voice recognition according to any of the examples disclosed and described herein. Alternatively, the playback device 110 may detect the first user device 306 and associate the first user device 306 with the first user 302 according to any of the examples disclosed and described herein, including but not limited to detecting the first user device 306 via, for example, periodically emitting a beacon via Bluetooth or Bluetooth Low Energy (BLE) or other suitable beacon or transmission. In such embodiments, the first user device 306 detects the beacon that is periodically emitted by the playback device 110 and, and in response to detecting the beacon from the playback device 110, the first user device 306 transmits an indication of the detected beacon to a cloud computing system (e.g., one of the computing systems 106a-c in FIG. 1B) associated with and/or in communication with the playback device 110. In response to receiving the indication of the playback device's 110 beacon from the first user device 306, the cloud computing system 106 transmits one or more messages to the playback device 110 to inform the playback device 110 that the first user 302 (or at least the first user device 306 associated with the first user 302) is within a proximity of (or otherwise near) the playback device 110.

Upon detection of the first user 302 (or at least after detecting the first user 302), the playback device 110 may retrieve or otherwise obtain the first user's 302 configuration data from the computing system(s) 106 via the network 102, and then begin using the first user's 302 configuration data to process voice and/or media playback/management commands as described herein.

At a second time, later than the first time, the playback device 110 may detect a second user 304 in the presence of (or otherwise near) the playback device 110 according to any of the examples disclosed and described herein. In some examples, the playback device 110 may retrieve or otherwise obtain the second user's 304 configuration data from the computing system(s) 106 via the network 102 and thereafter begin using the second user's configuration data to process voice and/or media playback/management commands as described herein. In some examples, the first user 302 configuration data and the second user 304 configuration data are used by the playback device 110 simultaneously, or at least during different but partially overlapping timeframes. This is desirable in some circumstances where the playback device is within a private environment and/or the first user 302 and the second user 304 are both in the presence of (or otherwise near) the playback device 110 at the second time. Alternatively, the first user 302 may not be in the presence of (or otherwise near) the playback device 110 at the second time. In such examples, after determining that the first user 302 is no longer in the presence of (or otherwise near) the playback device 110, e.g., via any of the reconfirmation methods disclosed herein, the playback device 110 may remove the first user's configuration data from memory, or otherwise cease using the first user's 302 configuration data to process voice and/or media playback commands. This is desirable in some circumstances where the playback device is, for example, in a public environment to prevent an unknown, unrelated, or other third party user from gaining access to the first user's 302 configuration data or otherwise using the first user's 302 configuration data for voice and/or media playback/management purposes.

VI. Example Operations

Figure 7:
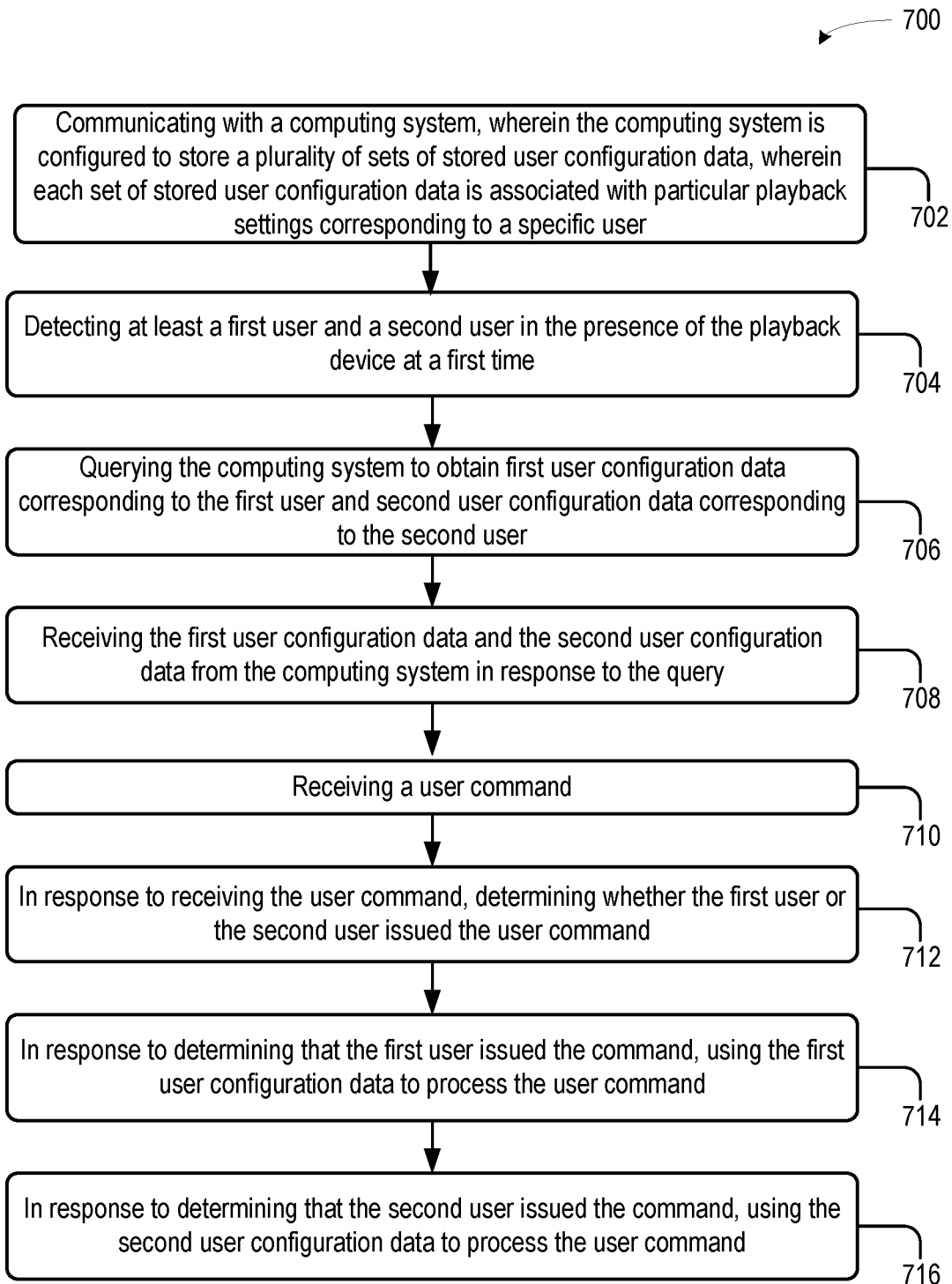
FIG. 7 is a flow chart of an example method.

As discussed above, in some examples, a playback device is configured to apply configuration data of multiple users and process user commands according to the specific user's request. FIG. 7 shows an example embodiment of a method 700 for a playback device 110 to apply configuration data of multiple users and process commands according to the specific user's request.

Method 700 can be implemented by any of the playback devices (e.g., playback device 110) disclosed herein, individually or in combination with any of the computing systems (e.g., computing system(s) 106) and/or user devices (e.g., user devices 306 and 308) disclosed herein, or any other computing system(s) and/or user device(s) now known or later developed.

Method 700 begins at block 702, which includes communicating with a computing system, wherein the computing system is configured to store a plurality of sets of stored user configuration data, wherein each set of stored user configuration data is associated with particular voice control and/or media playback settings corresponding to a specific user.

Next, method 700 advances to block 704, which includes detecting at least a first user and a second user in the presence of (or otherwise near) the playback device at a first time. In operation, detecting at least the first user and the second user in the presence of (or otherwise near) the playback device at the first time may include any of the user identification, user detection, and/or other procedures disclosed herein for detecting or otherwise determining that a user is near the playback device.

Next, method 700 advances to block 706, which includes querying the computing system to obtain first user configuration data corresponding to the first user and second user configuration data corresponding to the second user. The user configuration data for the first user and the second user may include any of the user configuration data disclosed herein.

Next, method 700 advances to block 708, which includes receiving the first user configuration data and the second user configuration data from the computing system in response to the query.

Next, method 700 advances to block 710, which includes receiving a user command. In an example embodiment, the user command includes voice data indicating a voice input via a microphone.

Next, method 700 advances to block 712, which includes determining which of the first user or the second user issued the user command, in response to receiving the user command. In some embodiments, if the user command is a voice user command, block 712 may further include using the first user voice recognition data included in the first user configuration data and the second voice recognition data included in the second user configuration data to determine which of the first user or the second user issued the user command. In some embodiments, block 712 includes sending at least a portion of the voice data to the computing system for voice recognition. Such embodiments may further include receiving an indication from the computing system indicating which one of the first user or the second user issued the voice user command.

Next, method 700 advances to block 714, which includes using the first user configuration data to process the user command, in response to determining the first user issued the command.

Next, method 700 advances to block 716, which includes using the second user configuration data to process the user command, in response to determining that the second user issued the command.

As additionally discussed above, in some examples, a computing system 106 is configured to apply configuration data of users to multiple playback devices, or otherwise configure a playback device to use configuration data of one or more individual users to process voice commands and/or play media content.

Figure 8:
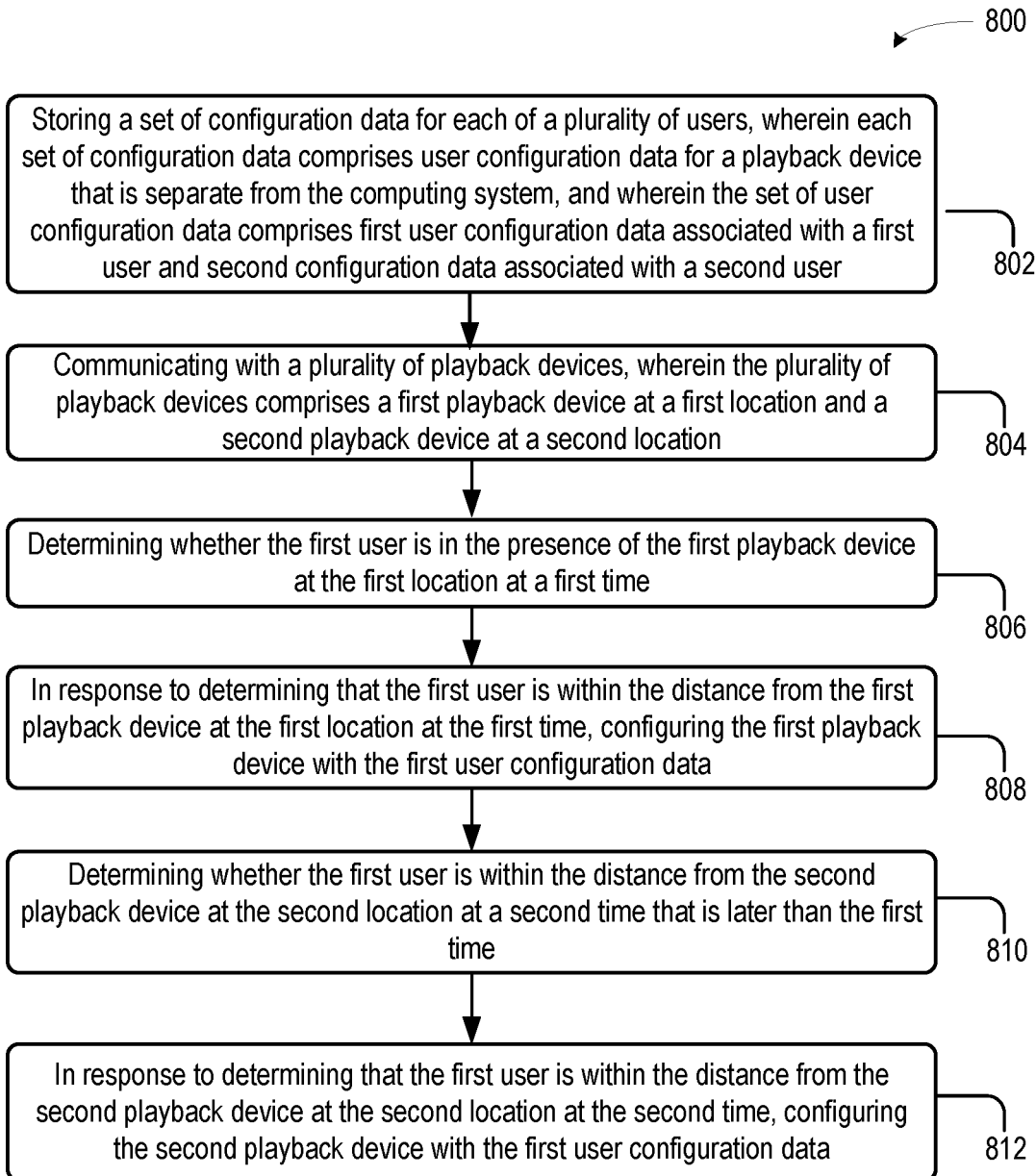
FIG. 8 is a flow chart of an example method.

FIG. 8 shows an example embodiment of a method 800 for a computing system 106 to configure multiple playback devices with user configuration data of a user.

Method 800 can be implemented by any of the computing system(s) (e.g., computing system(s) 106) disclosed herein, individually or in combination with any of the playback devices (e.g., playback device 110) and/or user devices (e.g., user devices 306 and 308) disclosed herein, or any other playback device(s) and/or user device(s) now known or later developed.

Method 800 begins at block 802, which includes storing a set of user configuration data for each of a plurality of users, wherein each set of user configuration data comprises user configuration data for a playback device that is separate from the computing system, and wherein the set of user configuration data comprises first user configuration data associated with a first user and second configuration data associated with a second user.

Next, method 800 advances to block 804, which includes communicating with a plurality of playback devices, wherein the plurality of playback devices comprises a first playback device at a first location and a second playback device at a second location.

Next, method 800 advances to block 806, which includes determining whether the first user is in the presence of (or otherwise near) the first playback device at the first location at a first time. In operation, determining whether the first user is in the presence of (or otherwise near) the first playback device at the first location at a first time may include any of the user identification, user detection, and/or other procedures disclosed herein for detecting or otherwise determining that a user is near the playback device.

Next, method 800 advances to block 808, which includes configuring the first playback device with the first user configuration data, in response to determining that the first user is in the presence of (or otherwise near) the first playback device at the first location at the first time. The first user configuration data may include any of the user configuration data disclosed herein.

Next, method 800 advances to block 810, which includes determining whether the first user is in the presence of (or otherwise near) the second playback device at the second location at a second time that is later than the first time. In operation, determining whether the first user is in the presence of (or otherwise near) the second playback device at the second location at a second time that is later than the first time may include any of the user identification, user detection, and/or other procedures disclosed herein for detecting or otherwise determining that a user is near the playback device.

Next, method 800 advances to block 812, which includes configuring the second playback device with the first user configuration data in response to determining that the first user is in the presence of (or otherwise near) the second playback device at the second location at the second time.

VII. Conclusion

The above discussions relating to playback devices, controller devices (sometimes referred to as user devices), playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments. Further, any of the features and functions disclosed and/or described herein may be used with any of the embodiments disclosed and/or described herein.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A network device comprising:
   one or more microphones;
   one or more processors; and
   tangible, non-transitory, computer-readable media storing program instructions executable by the one or more processors such that the network device is configured to:
   while the network device is configured to process voice commands received via the one or more microphones from a first user based on first user configuration data corresponding to the first user, wherein the first user configuration data comprises a first set of one or more media service user credentials associated with the first user, detect that a second user is within a predetermined proximity of the network device;
   after detecting that the second user is within the predetermined proximity of the network device, configure the network device to additionally process voice commands received via the one or more microphones from the second user based on second user configuration data corresponding to the second user such that the network device is configured to process voice commands received via the one or more microphones from both the first user and the second user, wherein the second user configuration data comprises a second set of one or more media service user credentials associated with the second user;
   after detecting a voice command via the one or more microphones while the network device is configured to process voice commands received via the one or more microphones from both the first user and the second user, (i) determine that the voice command was received from either the first user or the second user, (ii)

use the first set of one or more media service user credentials associated with the first user to process the voice command when it is determined that the voice command was received from the first user, and (iii) use the second set of one or more media service user credentials associated with the second user to process the voice command when it is determined that the voice command was received from the second user;

while the network device is configured to process voice commands received via the one or more microphones from both the first user and the second user, determine that the second user is no longer within the predetermined proximity of the network device; and after determining that the second user is no longer within the predetermined proximity of the network device, deactivate the second user configuration data at the network device.

2. The network device of claim 1, wherein the second user is associated with a computing device separate from the network device, and wherein the program instructions executable by the one or more processors such that the network device is configured to detect that the second user is within the predetermined proximity of the network device comprise program instructions executable by the one or more processors such that the network device is configured to:

detect that the second user is within the predetermined proximity of the network device based on detecting that the computing device associated with the second user is within the predetermined proximity of the network device.

3. The network device of claim 1, wherein the second user is associated with a computing device separate from the network device, and wherein the program instructions comprise further program instructions executable by the one or more processors such that the network device is configured to:

transmit a radio frequency signal detectable by the computing device associated with the second user.

4. The network device of claim 3, wherein the program instructions executable by the one or more processors such that the network device is configured to detect that the second user is within the predetermined proximity of the network device comprise program instructions executable by the one or more processors such that the network device is configured to:

after transmitting the radio frequency signal detectable by the computing device associated with the second user, detect that the second user is within the predetermined proximity of the network device based on receipt of one or more messages from the computing device associated with the second user, wherein the one or more messages from the computing device associated with the second user indicate that the computing device associated with the second user detected the radio frequency signal transmitted by the network device.

5. The network device of claim 3, wherein the program instructions executable by the one or more processors such that the network device is configured to detect that the second user is within the predetermined proximity of the network device comprise program instructions executable by the one or more processors such that the network device is configured to:

after transmitting the radio frequency signal detectable by the computing device associated with the second user, detect that the second user is within the predetermined proximity of the network device based on receipt of one or more messages from a computing system separate from both the network device and the computing device associated with the second user, wherein the one or more messages from the computing system indicate that the computing device associated with the second user detected the radio frequency signal transmitted by the network device.

6. The network device of claim 1, wherein the program instructions comprise further program instructions executable by the one or more processors such that the network device is configured to:

after configuring the network device to additionally process voice commands received via the one or more microphones from the second user based on second user configuration data corresponding to the second user such that the network device is configured to process voice commands received via the one or more microphones from both the first user and the second user, add the second user to an active user set comprising the first user and the second user.

7. The network device of claim 6, wherein the program instructions executable by the one or more processors such that the network device is configured to deactivate the second user configuration data at the network device comprise program instructions executable by the one or more processors such that the network device is configured to remove the second user from the active user set.

8. The network device of claim 1, wherein the program instructions comprise further program instructions executable by the one or more processors such that the network device is configured to:

after configuring the network device to additionally process voice commands received via the one or more microphones from the second user based on second user configuration data corresponding to the second user such that the network device is configured to process voice commands received via the one or more microphones from both the first user and the second user, add the second user to a set of regular users comprising the first user and the second user.

9. The network device of claim 8, wherein the program instructions executable by the one or more processors such that the network device is configured to add the second user to a set of regular users comprising the first user and the second user comprise program instructions executable by the one or more processors such that the network device is configured to store the second user configuration data in the tangible, non-transitory computer-readable media for future loading upon future detection of the second user.

10. The network device of claim 8, wherein the program instructions executable by the one or more processors such that the network device is configured to deactivate the second user configuration data at the network device comprise program instructions executable by the one or more processors such that the network device is configured to remove the second user from an active user set but keep the second user in the set of regular users comprising the first user and the second user.

11. The network device of claim 1, wherein the second user is associated with a computing device separate from the network device, and wherein the program instructions executable by the one or more processors such that the network device is configured to determine that the second user is no longer within the predetermined proximity of the network device comprise program instructions executable by the one or more processors such that the network device is configured to:

determine that the second user is no longer within the predetermined proximity of the network device based on failing to detect that the computing device associated with the second user is within the predetermined proximity of the network device.

12. The network device of claim 1, wherein the first user configuration data comprises first voice recognition data corresponding to the first user, wherein the second user configuration data comprises second voice recognition data corresponding to the second user, and wherein the program instructions executable by the one or more processors such that the network device is configured to determine whether the voice command was received from the first user or the second user comprise program instructions executable by the one or more processors such that the network device is configured to:
   use the first voice recognition data to determine whether the voice command was received from the first user; and
   use the second voice recognition data to determine whether the voice command was received from the second user.

13. The network device of claim 1, wherein the program instructions executable by the one or more processors such that the network device is configured to determine whether the voice command was received from the first user or the second user comprise program instructions executable by the one or more processors such that the network device is configured to:
   send at least a portion of the voice command to a computing system separate from the network device for voice recognition; and
   receive an indication from the computing system that the at least a portion of the voice command corresponds to one of the first user or the second user.

14. The network device of claim 1, wherein the program instructions executable by the one or more processors such that the network device is configured to configure the network device to additionally process voice commands received via the one or more microphones from the second user based on second user configuration data corresponding to the second user comprise instructions executable by the one or more processors such that the network device is configured to:
   query a computing system separate from the network device for the second user configuration data; and
   after querying the computing system, obtain the second user configuration data corresponding to the second user from the computing system.

15. The network device of claim 1, wherein the first user configuration data further comprises a first set of one or more media service preferences associated with the first user, wherein the second user configuration data further comprises a second set of one or more media service preferences associated with the second user, and wherein:
   the program instructions executable by the one or more processors such that the network device is configured to use the first user configuration data to process the voice command after determining that the voice command was received from the first user comprise program instructions executable by the one or more processors such that the network device is configured to additionally use the first set of one or more media service preferences associated with the first user to process the voice command; and
   the program instructions executable by the one or more processors such that the network device is configured to use the second user configuration data to process the voice command after determining that the voice command was received from the second user comprise program instructions executable by the one or more processors such that the network device is configured to additionally use the second set of one or more media service preferences associated with the second user to process the voice command.

16. Tangible, non-transitory, computer-readable media storing program instructions executable by one or more processors such that a network device comprising one or more microphones is configured to perform functions comprising:
   while the network device is configured to process voice commands received via the one or more microphones from a first user based on first user configuration data corresponding to the first user, wherein the first user configuration data comprises a first set of one or more media service user credentials associated with the first user, detecting that a second user is within a predetermined proximity of the network device;
   after detecting that the second user is within the predetermined proximity of the network device, configuring the network device to additionally process voice commands received via the one or more microphones from the second user based on second user configuration data corresponding to the second user such that the network device is configured to process voice commands received via the one or more microphones from both the first user and the second user, wherein the second user configuration data comprises a second set of one or more media service user credentials associated with the second user;
   after detecting a voice command via the one or more microphones while the network device is configured to process voice commands received via the one or more microphones from both the first user and the second user, (i) determining whether the voice command was received from the first user or the second user, (ii) using the first set of one or more media service user credentials associated with the first user to process the voice command after determining that the voice command was received from the first user, and (iii) using the second set of one or more media service user credentials associated with the second user to process the voice command after determining that the voice command was received from the second user;
   while the network device is configured to process voice commands received via the one or more microphones from both the first user and the second user, determining that the second user is no longer within the predetermined proximity of the network device; and
   after determining that the second user is no longer within the predetermined proximity of the network device, deactivating the second user configuration data at the network device.

17. The tangible, non-transitory computer-readable media of claim 16, wherein the second user is associated with a computing device separate from the network device, and wherein detecting that the second user is within the predetermined proximity of the network device comprises:
   detecting that the second user is within the predetermined proximity of the network device based on detecting that the computing device associated with the second user is within the predetermined proximity of the network device.

18. The tangible, non-transitory computer-readable media of claim 16, wherein the second user is associated with a computing device separate from the network device, and wherein the functions further comprise:
- transmitting a radio frequency signal detectable by the computing device associated with the second user.

19. The tangible, non-transitory computer-readable media of claim 18, wherein detecting that the second user is within the predetermined proximity of the network device comprises:
- after transmitting the radio frequency signal detectable by the computing device associated with the second user, detecting that the second user is within the predetermined proximity of the network device based on receipt of one or more messages from the computing device associated with the second user, wherein the one or more messages from the computing device associated with the second user indicate that the computing device associated with the second user detected the radio frequency signal transmitted by the network device.

20. The tangible, non-transitory computer-readable media of claim 18, wherein detecting that the second user is within the predetermined proximity of the network device comprises:
- after transmitting the radio frequency signal detectable by the computing device associated with the second user, detecting that the second user is within the predetermined proximity of the network device based on receipt of one or more messages from a computing system separate from both the network device and the computing device associated with the second user, wherein the one or more messages from the computing system indicate that the computing device associated with the second user detected the radio frequency signal transmitted by the network device.

21. The tangible, non-transitory computer-readable media of claim 16, wherein the functions further comprise:
- after configuring the network device to additionally process voice commands received via the one or more microphones from the second user based on second user configuration data corresponding to the second user such that the network device is configured to process voice commands received via the one or more microphones from both the first user and the second user, adding the second user to an active user set comprising the first user and the second user.

22. The tangible, non-transitory computer-readable media of claim 21, wherein deactivating the second user configuration data at the network device comprises removing the second user from the active user set.

23. The tangible, non-transitory computer-readable media of claim 16, wherein the functions further comprise:
- after configuring the network device to additionally process voice commands received via the one or more microphones from the second user based on second user configuration data corresponding to the second user such that the network device is configured to process voice commands received via the one or more microphones from both the first user and the second user, adding the second user to a set of regular users comprising the first user and the second user.

24. The tangible, non-transitory computer-readable media of claim 23, wherein adding the second user to a set of regular users comprising the first user and the second user comprises storing the second user configuration data in the tangible, non-transitory computer-readable media for future loading upon future detection of the second user.

25. The tangible, non-transitory computer-readable media of claim 23, wherein deactivating the second user configuration data at the network device comprises removing the second user from an active user set but keeping the second user in the set of regular users comprising the first user and the second user.

26. The tangible, non-transitory computer-readable media of claim 16, wherein the second user is associated with a computing device separate from the network device, and wherein determining that the second user is no longer within the predetermined proximity of the network device comprises:
- determining that the second user is no longer within the predetermined proximity of the network device based on failing to detect that the computing device associated with the second user is within the predetermined proximity of the network device.

27. The tangible, non-transitory computer-readable media of claim 16, wherein the first user configuration data comprises first voice recognition data corresponding to the first user, wherein the second user configuration data comprises second voice recognition data corresponding to the second user, and wherein determining whether the voice command was received from the first user or the second user comprises:
- using the first voice recognition data to determine whether the voice command was received from the first user; and
- using the second voice recognition data to determine whether the voice command was received from the second user.

28. The tangible, non-transitory computer-readable media of claim 16, wherein determining whether the voice command was received from the first user or the second user comprises:
- sending at least a portion of the voice command to a computing system separate from the network device for voice recognition; and
- receiving an indication from the computing system that the at least a portion of the voice command corresponds to one of the first user or the second user.

29. The tangible, non-transitory computer-readable media of claim 16, wherein configuring the network device to additionally process voice commands received via the one or more microphones from the second user based on second user configuration data corresponding to the second user comprises:
- querying a computing system separate from the network device for the second user configuration data; and
- after querying the computing system, obtaining the second user configuration data corresponding to the second user from the computing system.

30. The tangible, non-transitory computer-readable media of claim 16, wherein the first user configuration data comprises a first set of one or more media service user credentials and preferences associated with the first user, wherein the second user configuration data comprises a second set of one or more media service user credentials and preferences associated with the second user, and wherein:
- using the first user configuration data to process the voice command after determining that the voice command was received from the first user comprises using the first set of one or more media service user credentials and preferences associated with the first user to process the voice command; and
- using the second user configuration data to process the voice command after determining that the voice command was received from the second user comprises using the second set of one or more media service user credentials and preferences associated with the second user to process the voice command.

* * * * *